US009639454B2

(12) United States Patent
Fujiwara et al.

(10) Patent No.: US 9,639,454 B2
(45) Date of Patent: May 2, 2017

(54) COMPUTER-READABLE RECORDING MEDIUM STORING THEREIN TEST DATA GENERATING PROGRAM, TEST DATA GENERATING METHOD, TEST DATA GENERATING APPARATUS AND INFORMATION PROCESSING SYSTEM

(71) Applicant: FUJITSU LIMITED, Kawasaki-shi, Kanagawa (JP)

(72) Inventors: Shoichiro Fujiwara, Kawasaki (JP); Tadahiro Uehara, Yokohama (JP); Kazuki Munakata, Shiki (JP); Yoshiharu Maeda, Inagi (JP); Susumu Tokumoto, Kawasaki (JP); Asako Katayama, Kawasaki (JP); Supasit Monpratarnchai, Suginami (JP)

(73) Assignee: FUJITSU LIMITED, Kawasaki (JP)

( * ) Notice: Subject to any disclaimer, the term of this patent is extended or adjusted under 35 U.S.C. 154(b) by 519 days.

(21) Appl. No.: 14/089,215

(22) Filed: Nov. 25, 2013

(65) Prior Publication Data

US 2014/0229918 A1    Aug. 14, 2014

(30) Foreign Application Priority Data

Feb. 8, 2013 (JP) ................................. 2013-022950

(51) Int. Cl.
*G06F 9/44* (2006.01)
*G06F 11/36* (2006.01)

(52) U.S. Cl.
CPC ................................ *G06F 11/3684* (2013.01)

(58) Field of Classification Search
CPC ..................................................... G06F 9/45

(Continued)

(56) References Cited

U.S. PATENT DOCUMENTS 6,442,732 B1* 8/2002 Abramovici ........ G06F 17/5054
716/117
8,347,271 B1* 1/2013 Nallasivam ......... G06F 11/3684
717/132

(Continued)

FOREIGN PATENT DOCUMENTS

JP     2007-011477     1/2007
JP     2009-087355     4/2009

(Continued)

OTHER PUBLICATIONS

Tetsuo Tamai et al., "Symbolic Execution Systems", Jan. 1982, Information Processing Society of Japan, p. 18, right column, line 15 to p. 21, left column, line 32 with English translation.

(Continued)

*Primary Examiner* — Jue Louie
*Assistant Examiner* — Jae Jeon
(74) *Attorney, Agent, or Firm* — Oblon, McClelland, Maier & Neustadt, L.L.P.

(57) ABSTRACT

A computer-readable recording medium storing therein a test data generating program to be executed by a computer, the program causing the computer to: generate, for each of a plurality of path conditions obtained by repeatedly performing symbolic execution, a simplified path condition by substituting a fixed value for a first symbolic variable included in the path condition; calculate, for each the simplified path condition, a value of the symbolic variable that satisfies the simplified path condition; generate test data including the values of the symbolic variable, the fixed values, and path conditions not subjected to simplification; and remove duplicative data from the test data that corresponds to a same path condition.

20 Claims, 29 Drawing Sheets

(58) Field of Classification Search
USPC .......................................... 717/127, 151–159
See application file for complete search history.

(56) References Cited

U.S. PATENT DOCUMENTS

| | | | | |
|---|---|---|---|---|
| 8,533,680 | B2* | 9/2013 | Tillmann | G06F 11/3672 717/104 |
| 2003/0108107 | A1* | 6/2003 | Kim | H04N 19/00 375/242 |
| 2004/0019546 | A1* | 1/2004 | Ta | G06F 21/10 705/35 |
| 2007/0033440 | A1* | 2/2007 | Tillmann | G06F 11/3684 714/38.14 |
| 2007/0033443 | A1* | 2/2007 | Tillmann | G06F 11/3684 714/45 |
| 2007/0033576 | A1* | 2/2007 | Tillmann | G06F 11/3688 717/124 |
| 2007/0157169 | A1* | 7/2007 | Chen | G06F 8/74 717/120 |
| 2008/0010620 | A1* | 1/2008 | Moeller | G06Q 10/00 716/103 |
| 2009/0089759 | A1 | 4/2009 | Rajan et al. | |
| 2009/0089769 | A1 | 4/2009 | GRcevski et al. | |
| 2009/0265692 | A1* | 10/2009 | Godefroid | G06F 11/3688 717/128 |
| 2009/0281999 | A1* | 11/2009 | Sinha | G06F 8/433 |
| 2011/0072417 | A1* | 3/2011 | Dhurjati | G06F 11/3676 717/124 |
| 2011/0219359 | A1* | 9/2011 | Gupta | G06F 9/44 717/124 |
| 2011/0289488 | A1* | 11/2011 | Ghosh | G06F 11/3684 717/131 |
| 2012/0304157 | A1* | 11/2012 | Kawashima | G06F 11/3672 717/131 |
| 2013/0085720 | A1* | 4/2013 | Xie | G06F 9/455 703/1 |
| 2013/0283236 | A1* | 10/2013 | Kuznetsov | G06F 8/42 717/124 |

FOREIGN PATENT DOCUMENTS

| | | |
|---|---|---|
| JP | 2011-039718 | 2/2011 |
| JP | 2012-068869 | 4/2012 |

OTHER PUBLICATIONS

James C. King, "Symbolic Execution and Program Testing", IBM Thomas J. Watson Research Center, Communication of the ACM, Jul. 1976, vol. 19, No. 7, pp. 385-394.

Kazuki Munakata, et al., "Test Case Selection based on Path Conditions of Symbolic Execution", 2012 19th Asia-Pacific Software Engineering Conference, 2012 IEEE Computer Society, pp. 318-321.

Tetsuo Tami et al., "Symbolic Execution Systems", Jan. 1982, Information Processing Society of Japan, with English translation, 18 pages.

* cited by examiner

FIG. 5

```
public class TargetClass {
  public int method1(int p1, int p2, String p3){
    if(!p3.startsWith("ZZ01")){
      return -1;
    }
    int bias=0;
    String mode = p3.substring(4);
    if(mode.equals("00")){
      bias = 100;
    }else if(mode. equals("01")){
      bias = 50;
    }
    int diff = p1-p2+bias;
    int code;
    if(diff>0){
      code = 0;
    }else if(diff==0){
      code = 1;
    }else{
      code = 2;
    }
    return code;
  }
```

FIG. 7

```
public class SDriver {
  @Symbolic("true")
  public static int param1=100;
  @Symbolic("true")
  public static int param2=100;
  @Symbolic("true")
  public static String param3 = "ZZ0100";

public static void main(String[] args){
    TargetClass target = new TargetClass();
    int code = target.method1(param1, param2, param3);
  }
}
```

FIG. 10

| NO. | TEST INPUT | PATH CONDITION |
|---|---|---|
|  |  |  |

FIG. 12

| NAME OF VARIABLE | TYPE OF VARIABLE |
|---|---|
| SDriver.param1 | int |
| SDriver.param2 | int |
| SDriver.param3 | String |

FIG. 14

| NO. | FREE SYMBOLIC VARIABLE | FIXED SYMBOLIC VARIABLE |
|---|---|---|
| 1 | SDriver.param1 | SDriver.param2<br>SDriver.param3 |
| 2 | SDriver.param2 | SDriver.param1<br>SDriver.param3 |
| 3 | SDriver.param3 | SDriver.param1<br>SDriver.param2 |

FIG. 15

| NAME OF FIXED SYMBOLIC VARIABLE | TYPE OF VARIABLE | FIXED VALUE |
|---|---|---|
| SDriver.param2 | int | 100 |
| SDriver.param3 | String | "ZZ0100" |

| NAME OF FIXED SYMBOLIC VARIABLE | TYPE OF VARIABLE | FIXED VALUE |
|---|---|---|
| SDriver.param1 | int | 100 |
| SDriver.param3 | String | "ZZ0100" |

| NAME OF FIXED SYMBOLIC VARIABLE | TYPE OF VARIABLE | FIXED VALUE |
|---|---|---|
| SDriver.param1 | int | 100 |
| SDriver.param2 | int | 100 |

FIG. 17

| SYMBOLIC VARIABLE | TYPE OF VARIABLE | SYMBOLIC VALUE (APPEAR IN PATH CONDITION) |
| --- | --- | --- |
| SDriver.param1 | int | param1 |
| SDriver.param2 | int | param2 |
| SDriver.param3 | String | param3 |

FIG. 26

| NO. | TEST INPUT | PATH CONDITION |
|---|---|---|
| 1 | param1=1<br>param2 = 100<br>param3 = "ZZ0100" | param3.startsWith("ZZ01")∧<br>(param3.subString(4).equals("00"))∧<br>(param1 - param2 + 100)>0 |
| 2 | param1=0<br>param2 = 100<br>param3 = "ZZ0100" | param3.startsWith("ZZ01")∧<br>(param3.subString(4).equals("00"))∧<br>(param1 - param2 + 100)<=0∧<br>(param1 - param2 + 100)==0 |
| 3 | param1=-1<br>param2 = 100<br>param3 = "ZZ0100" | param3.startsWith("ZZ01")∧<br>(param3.subString(4).equals("00"))∧<br>(param1 - param2 + 100)<=0∧<br>(param1 - param2 + 100)!=0 |
| 4 | param1=100<br>param2 = 0<br>param3 = "ZZ0100" | param3.startsWith("ZZ01")∧<br>(param3.subString(4).equals("00"))∧<br>(param1 - param2 + 100)>0 |
| 5 | param1=100<br>param2 = 200<br>param3 = "ZZ0100" | param3.startsWith("ZZ01")∧<br>(param3.subString(4).equals("00"))∧<br>(param1 - param2 + 100)<=0∧<br>(param1 - param2 + 100)==0 |
| 6 | param1=100<br>param2 = 201<br>param3 = "ZZ0100" | param3.startsWith("ZZ01")∧<br>(param3.subString(4).equals("00"))∧<br>(param1 - param2 + 100)<=0∧<br>(param1 - param2 + 100)!=0 |
| 7 | param1=100<br>param2 = 100<br>param3 = "" | !param3.startsWith("ZZ01") |
| 8 | param1=100<br>param2 = 100<br>param3 = "ZZ0100" | param3.startsWith("ZZ01")∧<br>(param3.subString(4).equals("00"))∧<br>(param1 - param2 + 100)>0 |
| 9 | param1=100<br>param2 = 100<br>param3 = "ZZ0101" | param3.startsWith("ZZ01")∧<br>(!param3.subString(4).equals("00"))∧<br>(param3.subString(4).equals("01"))∧<br>(param1 - param2 + 50)>0 |
| 10 | param1=100<br>param2 = 100<br>param3 = "ZZ0101" | param3.startsWith("ZZ01")∧<br>(!param3.subString(4).equals("00"))∧<br>(!param3.subString(4).equals("01"))∧<br>(param1 - param2 + 0)<=0∧<br>(param1 - param2 + 0)!=0 |

FIG. 28

| NO. | TEST INPUT | PATH CONDITION |
|---|---|---|
| 1 | param1=1<br>param2 = 100<br>param3 = "ZZ0100" | param3.startsWith("ZZ01")∧<br>(param3.subString(4).equals("00"))∧<br>(param1 - param2 + 100)>0 |
| 2 | param1=0<br>param2 = 100<br>param3 = "ZZ0100" | param3.startsWith("ZZ01")∧<br>(param3.subString(4).equals("00"))∧<br>(param1 - param2 + 100)<=0∧<br>(param1 - param2 + 100)==0 |
| 3 | param1=-1<br>param2 = 100<br>param3 = "ZZ0100" | param3.startsWith("ZZ01")∧<br>(param3.subString(4).equals("00"))∧<br>(param1 - param2 + 100)<=0∧<br>(param1 - param2 + 100)!=0 |
| 7 | param1=100<br>param2 = 100<br>param3 = "" | !param3.startsWith("ZZ01") |
| 9 | param1=100<br>param2 = 100<br>param3 = "ZZ0101" | param3.startsWith("ZZ01")∧<br>(!param3.subString(4).equals("00"))∧<br>(param3.subString(4).equals("01"))∧ |
| 10 | param1=100<br>param2 = 100<br>param3 = "ZZ0101" | (param1 - param2 + 50)>0<br>param3.startsWith("ZZ01")∧<br>(!param3.subString(4).equals("00"))∧<br>(!param3.subString(4).equals("01"))∧<br>(param1 - param2 + 0)<=0∧<br>(param1 - param2 + 0)!=0 |

US 9,639,454 B2

COMPUTER-READABLE RECORDING MEDIUM STORING THEREIN TEST DATA GENERATING PROGRAM, TEST DATA GENERATING METHOD, TEST DATA GENERATING APPARATUS AND INFORMATION PROCESSING SYSTEM

CROSS-REFERENCE TO RELATED APPLICATION

This application is based upon and claims the benefit of priority of the prior Japanese Patent Application No. 2013-022950, filed on Feb. 8, 2013, the entire contents of which are incorporated herein by reference.

FIELD

Embodiment discussed herein is related to a technique for generating test data.

BACKGROUND

A test case set including test input, expected results, and the like is prepared so that all the points to be checked are covered in a comprehensive manner when a program test is executed. In an operation for preparing test cases, test input generation is often manually performed.

Related technologies are disclosed in Japanese Laid-open Patent Publication Nos. 2009-87355 and 2012-068869, TAMAI, Tetsuo, FUKUNAGA, Koichi, "Symbolic Execution System (Kigou Jikkou Sisutemu)", *Information Processing*, Information Processing Society of Japan, Vol. 23 No. 1, p. 18-28, January 1982, and MUNAKATA, Kazuki, et al., "Test Case Selection based on Path Conditions of Symbolic Execution", 19*th Asia-Pacific Software Engineering Conference*, IEEE computer society, p. 318-321, 2012.

SUMMARY

According to one aspect of the embodiments, a computer-readable recording medium storing therein a test data generating program to be executed by a computer, the program causing the computer to: generate, for each of a plurality of path conditions obtained by repeatedly performing symbolic execution, a simplified path condition by substituting a fixed value for a first symbolic variable included in the path condition; calculate, for each the simplified path condition, a value of the symbolic variable that satisfies the simplified path condition; generate test data including the values of the symbolic variable, the fixed values, and path conditions not subjected to simplification; and remove duplicative data from the test data that corresponds to a same path condition.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates an example of a program storing unit;
FIG. 7 illustrates an example of a driver storing unit;
FIG. 10 illustrates an example of a test case storing unit;
FIG. 12 illustrates an example of a variable storing unit;
FIG. 14 illustrates examples of combinations;
FIG. 15 illustrates an example of a fixed data storing unit;
FIG. 17 illustrates an example of execution engine management data;
FIG. 26 illustrates an example of a first test case storing unit;
FIG. 28 illustrates an example of a second test case storing unit.

DESCRIPTION OF EMBODIMENT

In order to reduce labor, test input generation is performed by symbolic execution. In symbolic execution, a program is executed while holding specific values called symbolic values, without embodying variables in the program. A variable holding a symbolic value is referred to as a symbolic variable. In symbolic execution, in the case where a symbolic variable is used in a determination condition for branching or the like, paths in the case where the determination condition is satisfied and paths in the case where the determination condition is not satisfied are covered in a comprehensive manner. For execution of a path, for example, a condition to be satisfied by a symbolic variable is held in order that a determination condition is satisfied or in order that the determination condition is not satisfied. The condition is called a path condition and is held for each path performed in the symbolic execution. In the case where no value satisfying a specific path condition (hereinafter, referred to as a satisfying value) exists, a path for the path condition is not performed. Thus, the path is excluded from the target of a test. In the case where a satisfying value for the path condition exists, satisfying solution is set for test input.

In symbolic execution, for example, due to the occurrence of path explosion, the symbolic execution might not be able to be performed with practical time and calculation amount.

Figure 1:
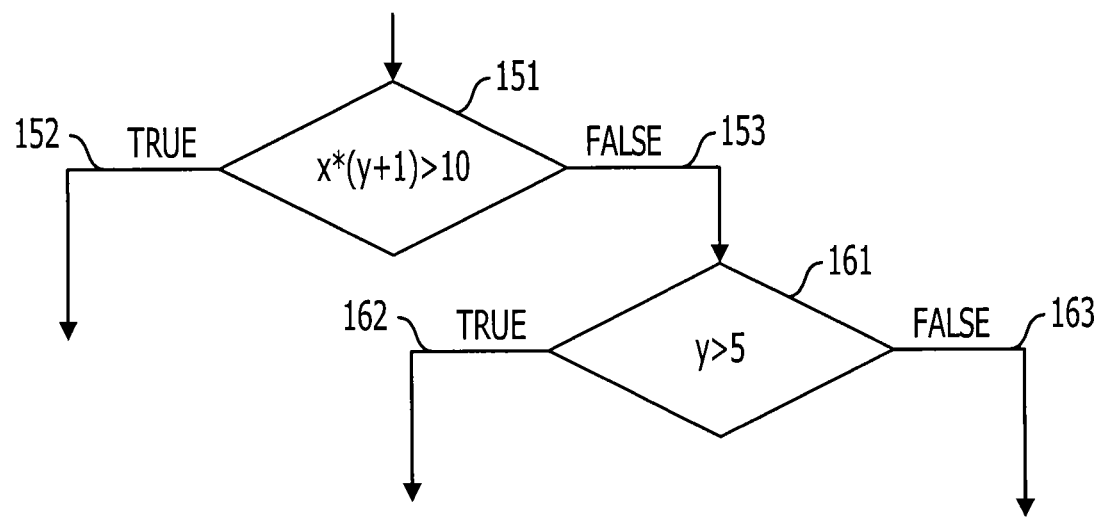
FIG. 1 illustrates an example of symbolic execution.
Figure 2:
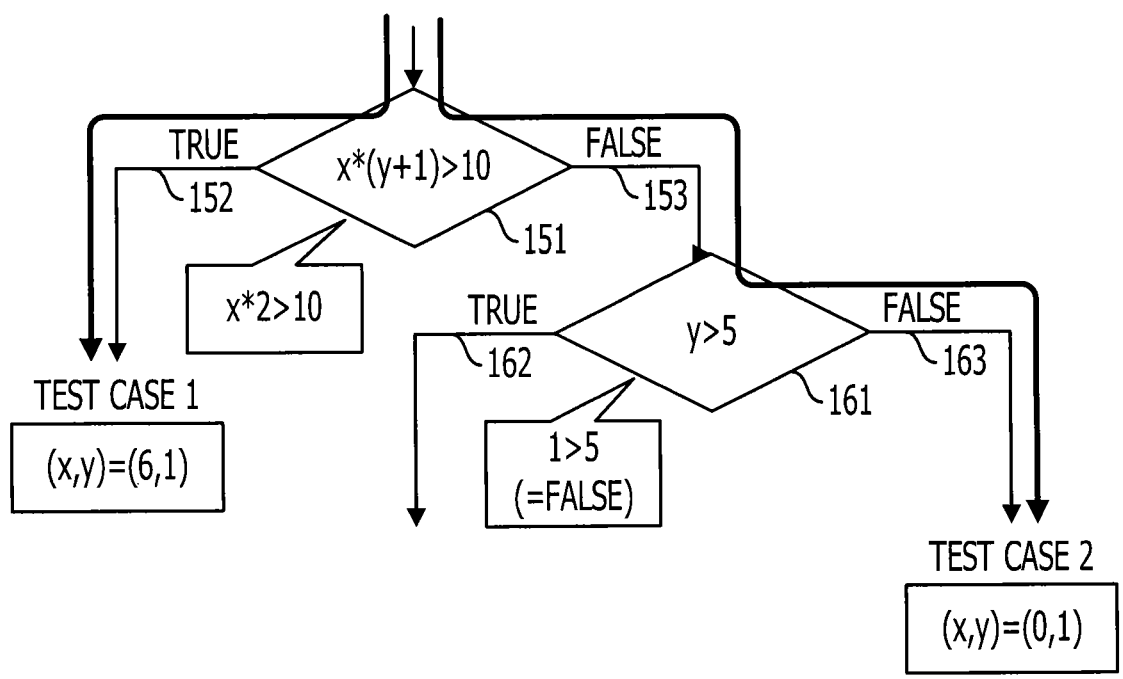
FIG. 2 illustrates an example of symbolic execution.
Figure 3:
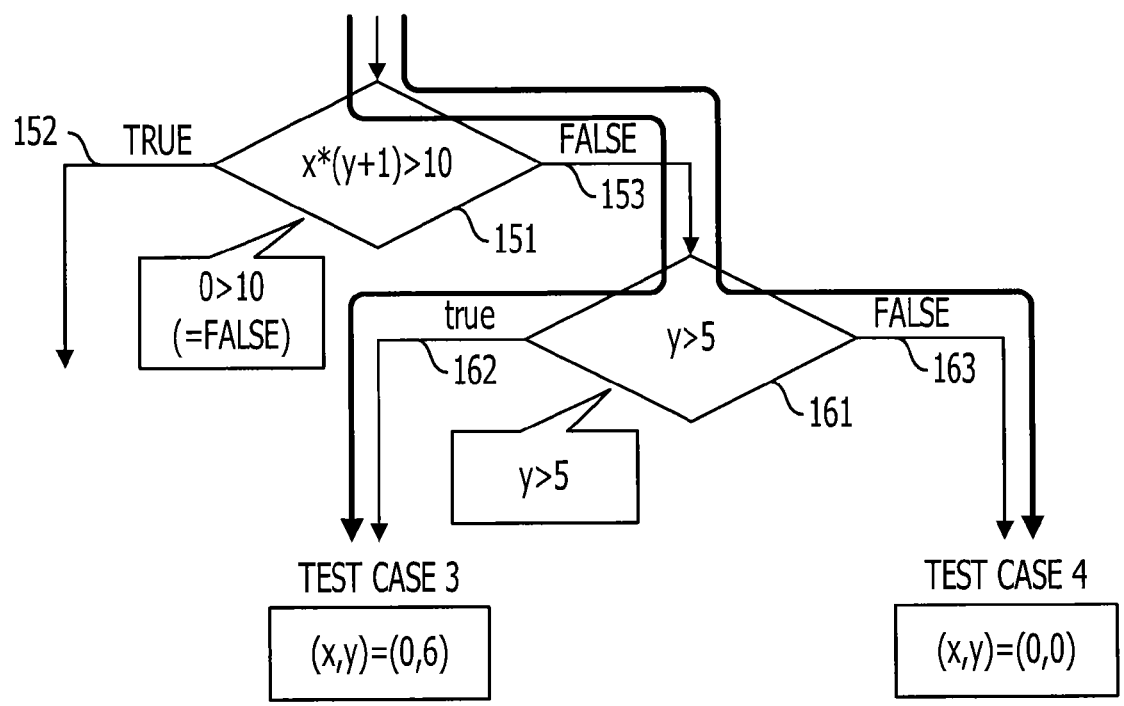
FIG. 3 illustrates an example of symbolic execution.

In order to suppress occurrence of path explosion, symbolic execution is repeatedly performed while switching a variable to be symbolized. FIGS. 1 to 3 illustrate an example of symbolic execution.

For example, symbolic execution is performed for a program having a control structure illustrated in FIG. 1. Variables in the program illustrated in FIG. 1 may be x and y. In this program, at a branch 151, it is determined whether or not the condition "x*(y+1)>10" is satisfied. In the case where the condition is satisfied, the program proceeds to a route 152. In the case where the condition is not satisfied, the program proceeds to a route 153. At a branch 161, it is determined whether the condition "y>5" is satisfied. In the case where the condition is satisfied, the program proceeds to a route 162. In the case where the condition is not satisfied, the program proceeds to a route 163.

Referring to FIG. 2, symbolic execution is performed by defining x as a symbolic variable and defining y as a default value ("1" in the example of FIG. 2). The determination condition at the branch 151 is "x*2>10". As a test case for the case where the program proceeds to the route 152, for example, a test case 1 including test input (x,y)=(6,1) is generated. Since the determination condition at the branch 161 is "1>5" and this determination condition is not satisfied, the program proceeds to the route 163. For example, a test case 2 including test input (x,y)=(0,1) is generated.

Referring to FIG. 3, symbolic execution is performed by defining x as a default value, such as, for example, 0, and defining y as a symbolic variable. Since the determination condition at the branch 151 is "0>10" and this condition is not satisfied, the program proceeds to the route 153. The determination condition at the branch 161 remains the same, that is, "y>5". As a test case for the case where the program proceeds to the route 162, a test case 3 including, for example, test input (x,y)=(0,6) is generated. As a test case for the case where the program proceeds to the route 163, a test case 4 including, for example, test input (x,y)=(0,0) is generated.

As illustrated in FIGS. 1 to 3, since the number of symbolic variables handled at the same time is reduced, occurrence of path explosion may be reduced. Some test cases may be redundant. For example, in FIGS. 1 to 3, since the test case 2 and the test case 4 are prepared for the same path, one of the test cases may be unnecessary.

Figure 4:
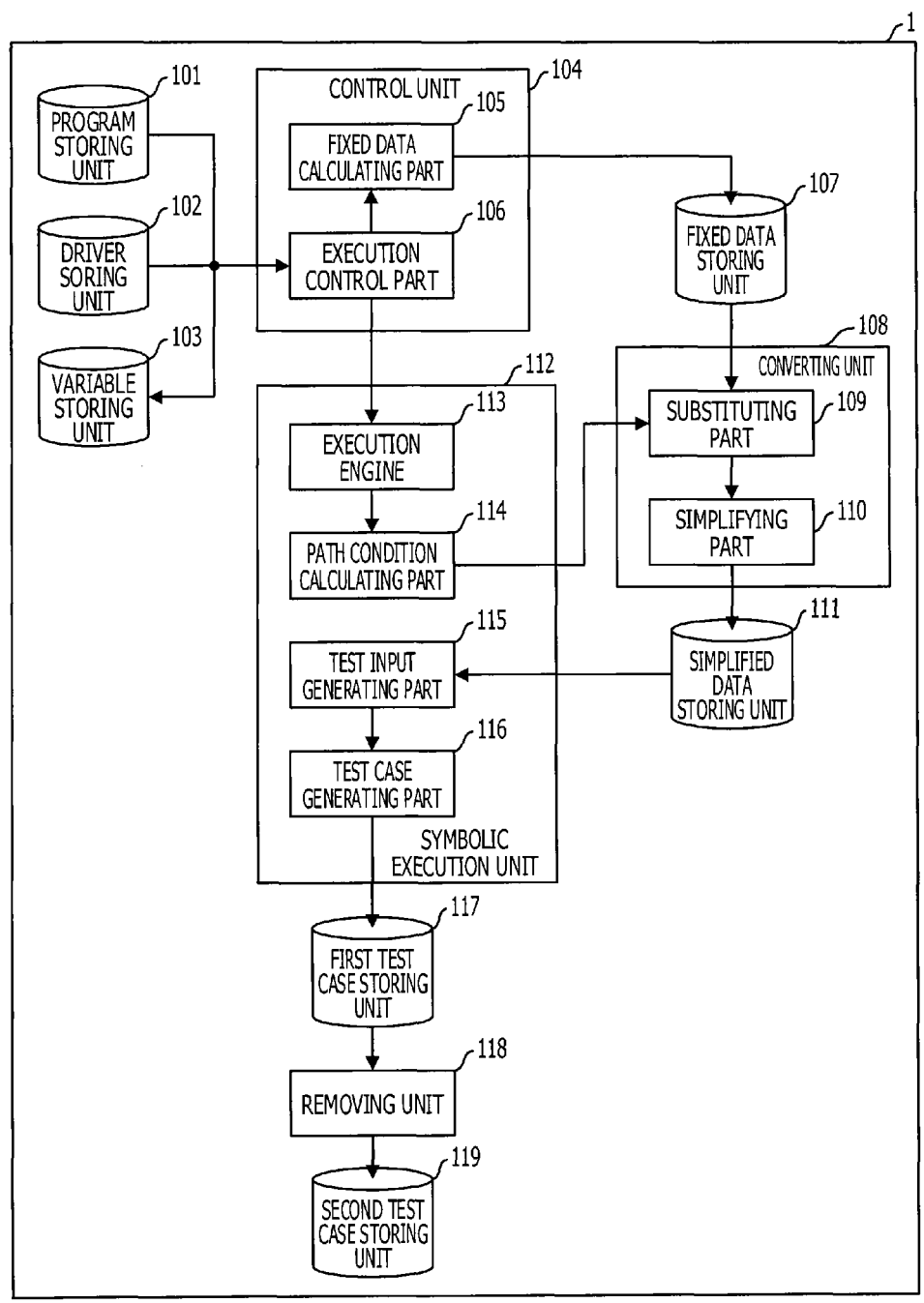
FIG. 4 illustrates an example of a test case generating apparatus.

FIG. 4 illustrates an example of a test case generating apparatus. A test case generating apparatus 1 includes a program storing unit 101, a driver storing unit 102 a variable storing unit 103, a control unit 104 including a fixed data calculating part 105 and an execution control part 106, a fixed data storing unit 107, a converting unit 108 including a substituting part 109 and a simplifying part 110, a simplified data storing unit 111, a symbolic execution unit 112 including an execution engine 113, a path condition calculating part 114, a test input generating part 115, and a test case generating part 116, a first test case storing unit 117, a removing unit 118, and a second test case storing unit 119.

The execution control part 106 extracts candidates for symbolic variables based on data stored in the driver storing unit 102, and stores the extracted candidates into the variable storing unit 103. The execution control part 106 outputs a program stored in the program storing unit 101 and information on a symbolic variable to the execution engine 113. The fixed data calculating part 105 generates data of a fixed symbolic variable and stores the generated data into the fixed data storing unit 107.

The substituting part 109 substitutes a fixed value stored in the fixed data storing unit 107 into a path condition received from the path condition calculating part 114. The simplifying part 110 generates a simplified path condition by simplifying the path condition received from the substituting part 109, and stores the generated simplified path condition into the simplified data storing unit 111.

In response to a request from the execution control part 106, the execution engine 113 performs symbolic execution. The execution engine 113 may be a module which performs symbolic execution, and may be, for example, a Java® PathFinder. The path condition calculating part 114 generates a path condition and outputs the generated path condition to the converting unit 108. The test input generating part 115 calculates a satisfying value which satisfies the simplified path condition stored in the simplified data storing unit 111, and outputs test input including the satisfying value and a fixed value to the test case generating part 116. The test case generating part 116 generates a test case including the test input and the path condition, and stores the generated test case into the first test case storing unit 117.

The removing unit 118 performs processing using the data stored in the first test case storing unit 117, and stores a result of the processing into the second test case storing unit 119.

FIG. 5 illustrates an example of a program storing unit. The program storing unit illustrated in FIG. 5 may be the program storing unit 101 illustrated in FIG. 4. For example, a program on which symbolic execution is to be performed may be stored in the program storing unit illustrated in FIG. 5.

Figure 6:
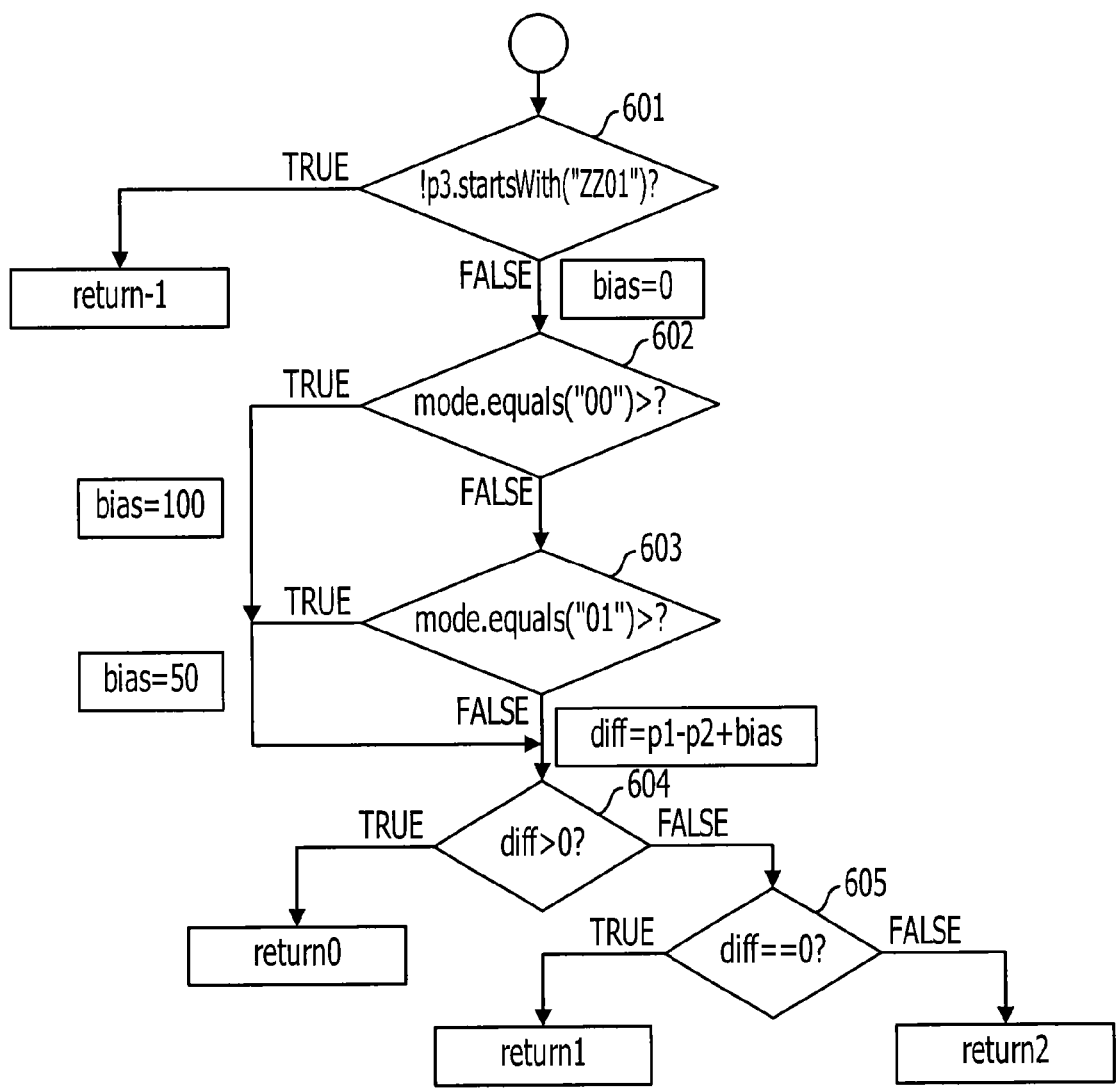
FIG. 6 illustrates an example of a control structure of a program.

FIG. 6 illustrates an example of a control structure of a program. The control structure illustrated in FIG. 6 may be the control structure of the program illustrated in FIG. 5. This control structure includes a branch 601 providing a condition of "!p3.startsWith("ZZ01")", a branch 602 providing a condition of "mode.equals("00")>", a branch 603 providing a condition of "mode.equals("01")>", a branch providing a condition of "diff>0", and a branch 605 providing a condition of "diff==0".

FIG. 7 illustrates an example of a driver storing unit. The driver storing unit illustrated in FIG. 7 may be the driver storing unit 102 illustrated in FIG. 4. Referring to FIG. 7, a driver for starting symbolic execution is stored. The driver may include a portion declaring a symbolic variable, such as a variable declaration instruction with an annotation "@Symbolic("true")" starting with "public static" illustrated in FIG. 7, and a portion calling a program on which symbolic execution is to be performed, such as an instruction "int code=target.method1 (param1, param2, param3);" illustrated in FIG. 7.

Two types of symbolic variables including a free symbolic variable and a fixed symbolic variable may be introduced. Free symbolic variables may be normal symbolic variables. Fixed symbolic variables may be symbolic variables having a fixed value.

When a path condition is obtained by symbolic execution, a free symbolic variable and a fixed symbolic variable may be handled in a similar manner as normal symbolic variables. When test input is calculated using an obtained path condition, only a free symbolic variable is handled as in a similar manner as normal symbolic variables. A fixed value is substituted for a fixed symbolic variable, and a simplified path condition is generated. By obtaining a satisfying value of the simplified path condition, test input is generated.

Figure 8A:
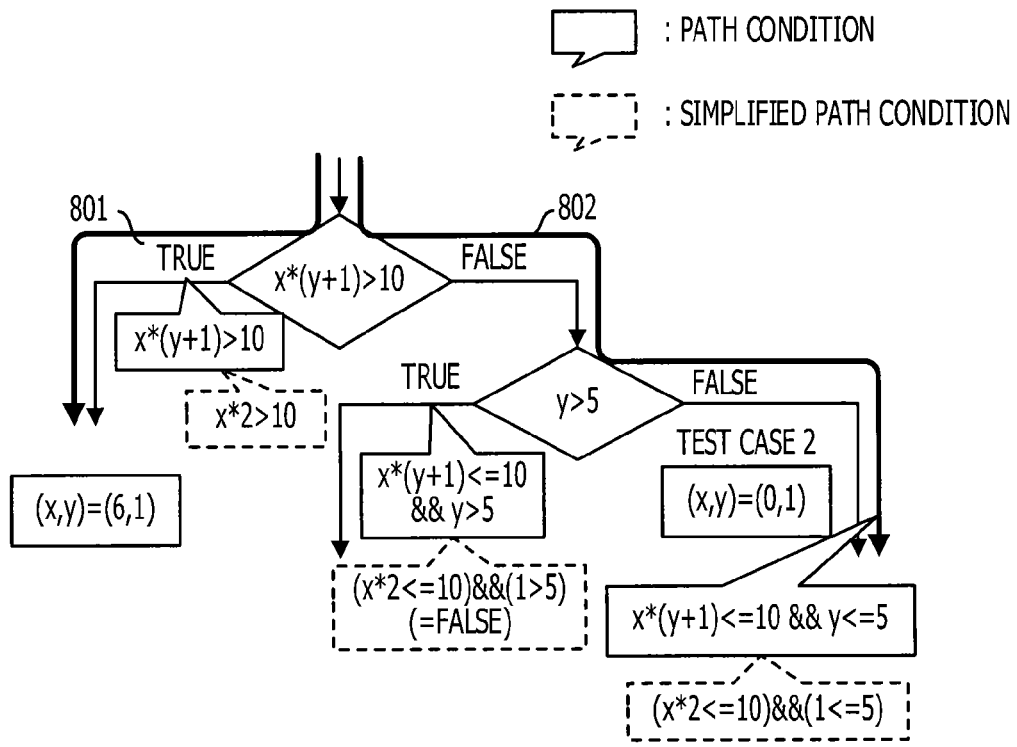
FIGS. 8A and 8B illustrate an example of operation of a test case generating apparatus.
Figure 8B:
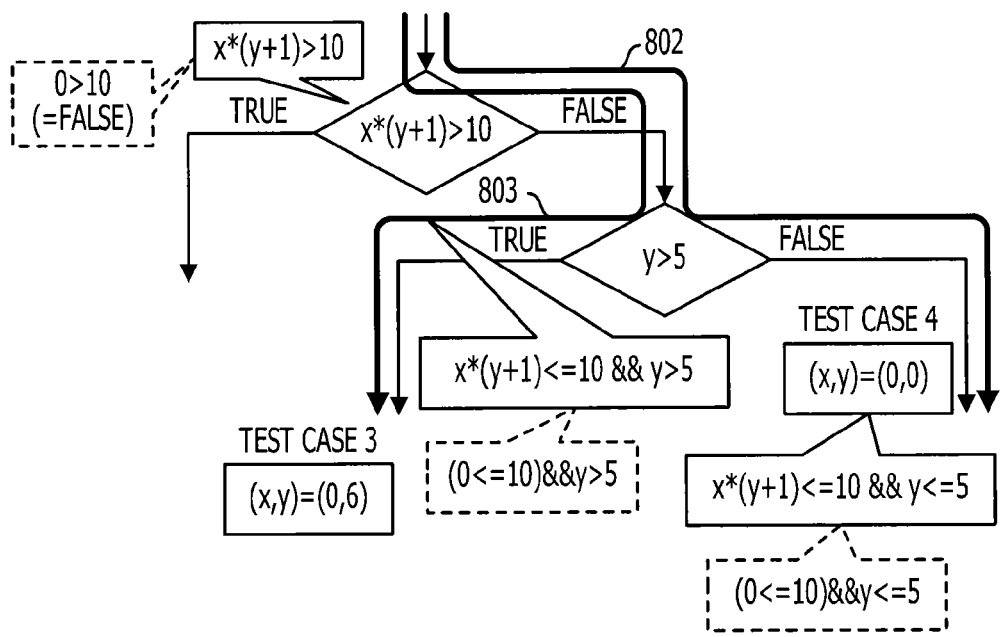

FIGS. 8A and 8B illustrate an example of an operation of a test case generating apparatus. FIGS. 8A and 8B illustrate processing performed for the program illustrated in FIGS. 1 to 3. Referring to FIG. 8A, symbolic execution is performed by defining a variable x as a free symbolic variable and defining a variable y as a fixed symbolic variable. Referring to FIG. 8B, symbolic execution is performed by defining a variable y as a free symbolic variable and defining a variable x as a fixed symbolic variable. In either case, path conditions are generated for paths 801 to 803 of the program.

Referring to FIG. 8A, a fixed value 1 is substituted for a fixed symbolic variable y so that each path condition is simplified. For the path 801, a simplified path condition "x*2>10" is obtained. For the path 802, a simplified path condition "(x*2<=10)&&(1<=5)" is obtained. For the path 803, a simplified path condition "(x*2<=10)&&(1>5)" is obtained. By obtaining satisfying values for the simplified path conditions, a test case 1 and a test case 2 are generated for the path 801 and the path 802, respectively. Since the value of x that satisfies the simplified path condition for the path 803 does not exist, no test case may be generated for the path 803.

Referring to FIG. 8B, by substituting a fixed value 0 for a fixed symbolic variable x, each path condition is simplified. For the path 801, a simplified path condition "0>10" is obtained. For the path 802, a simplified path condition "(0<=10)&&(y<=5)" is obtained. For the path 803, a simplified path condition "(0<=10)&&(y>5)" is obtained. By obtaining satisfying values for the simplified path conditions, a test case 3 and a test case 4 are generated for the path 803 and the path 802, respectively. Since the value of y which satisfies the simplified path condition for the path 801 does not exist, no test case may be generated for the path 801.

At this point in time, the test case 2 and the test case 4 are redundant. However, the redundancy is removed by comparing path conditions before simplification. The path condition for the test case 1 is "x*(y+1)>10". The path condition for the test case 2 is "x*(y+1)<10&&y<=5". The path condition for the test case 3 is "x*(y+1)<=10&&y>5". The path condition for the test case 4 is "x*(y+1)=<10&&y<=5". Since the path condition for the test case 2 and the path condition for the test case 4 are the same, it may be determined that the test case 2 and the test case 4 are redundant. Thus, redundant test data may be removed by removing the test case 2 or the test case 4.

Figure 9:
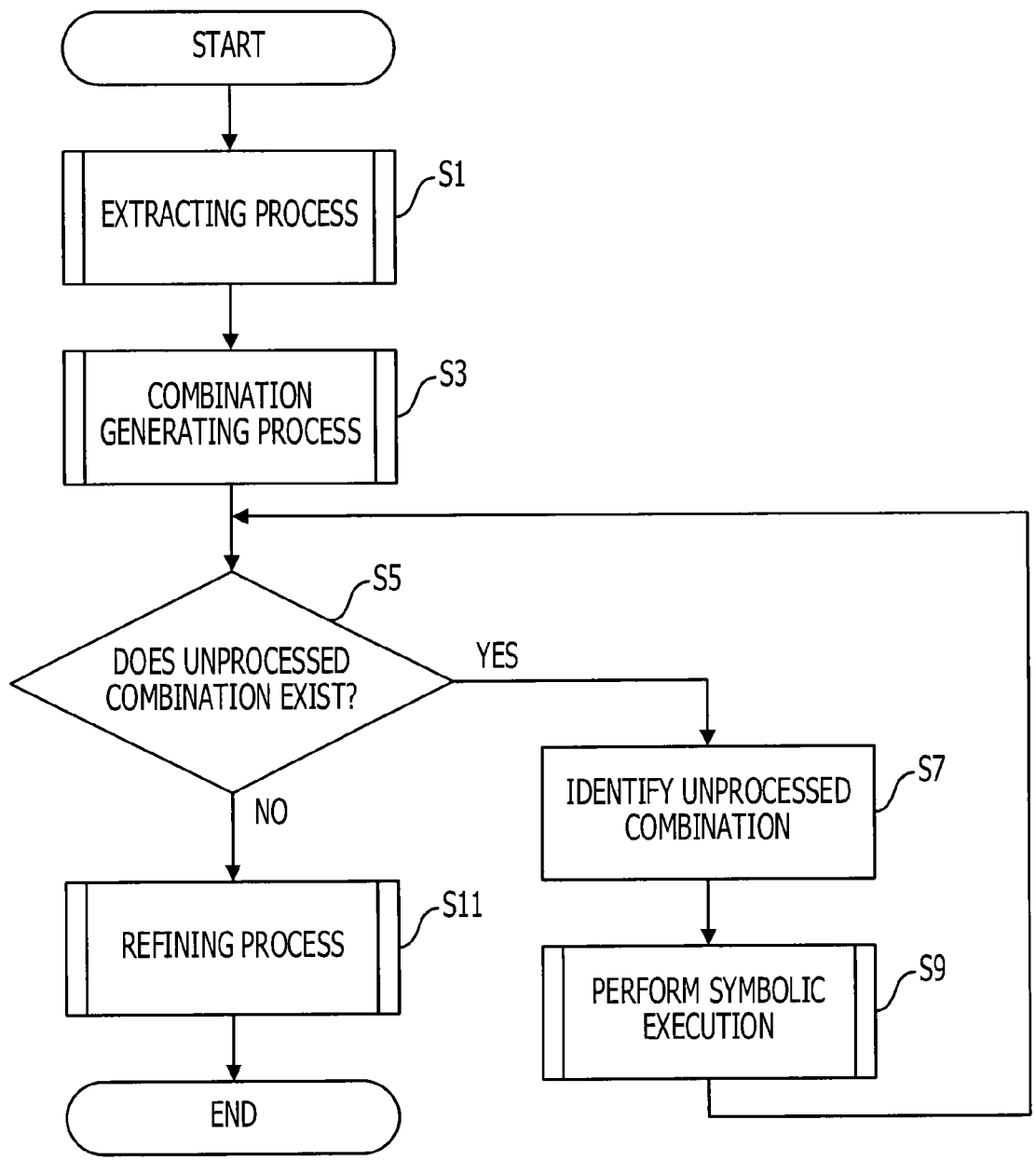
FIG. 9 illustrates an example of a test case generating apparatus.
Figure 10:
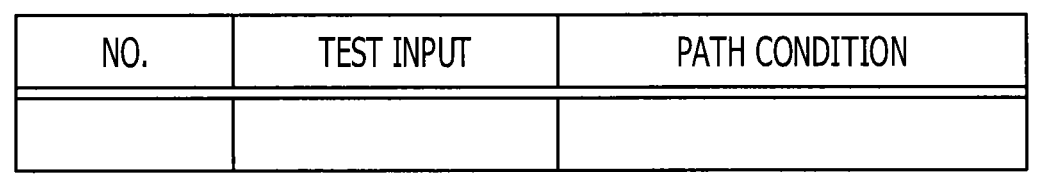

FIG. 9 illustrates an example of an operation of a test case generating apparatus. The test case generating apparatus may be the test case generating apparatus 1 illustrated in FIG. 4. For example, upon receiving an instruction to generate a test case from an operator, the execution control part 106 of the control unit 104 performs an extracting process (FIG. 9: operation S1). FIG. 10 illustrates an example of a test case storing unit. At the time of starting the process, the first test case storing unit 117 and the second test case storing unit 119 may be empty, as illustrated in FIG. 10, for example.

Figure 11:
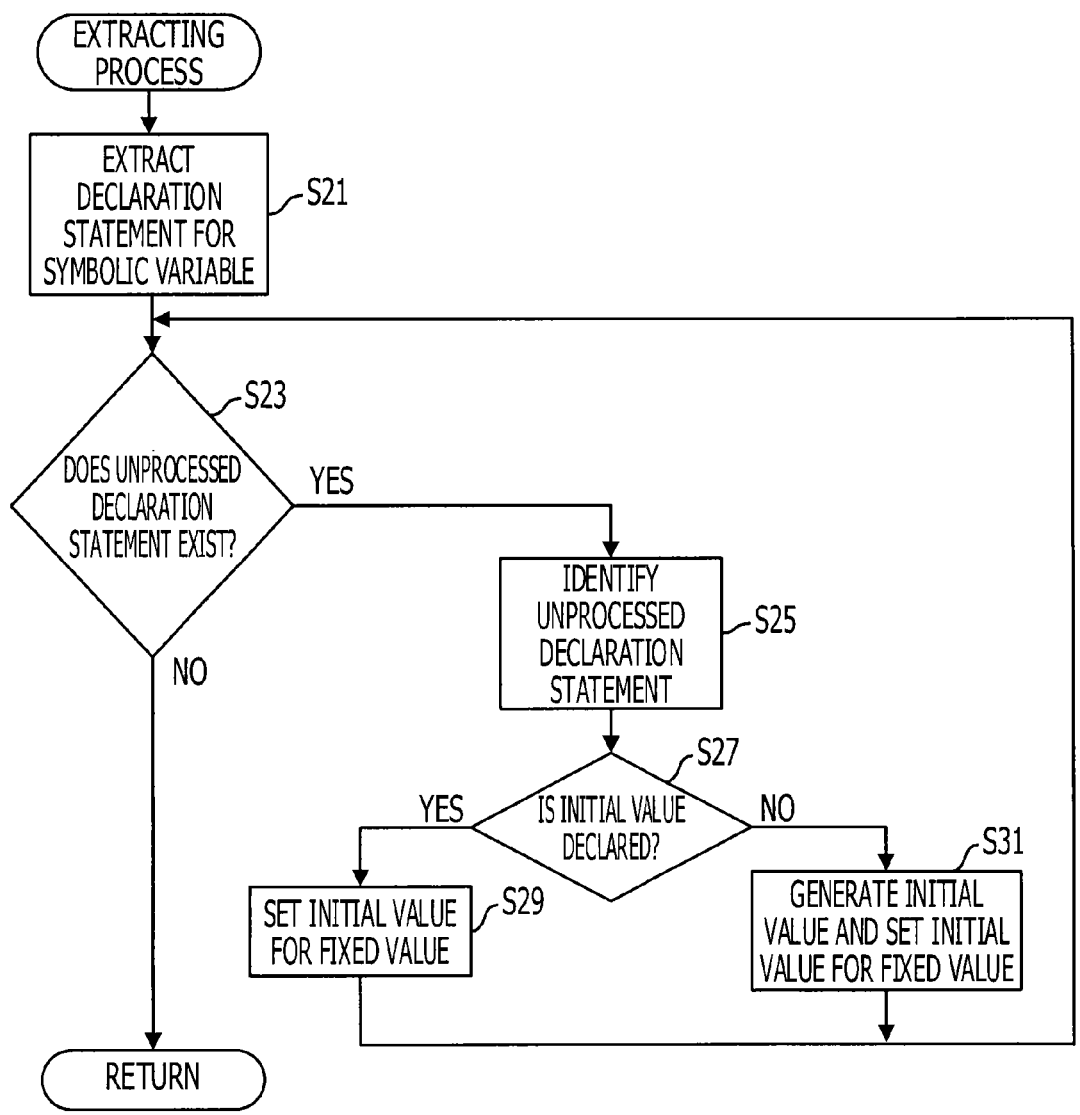
FIG. 11 illustrates an example of an extracting process.

FIG. 11 illustrates an example of an extracting process. The extracting process illustrated in FIG. 11 may be the extracting process S1 illustrated in FIG. 9. The execution control part 106 extracts a declaration statement for a symbolic variable in a driver stored in the driver storing unit 102 (FIG. 11: operation S21). The declaration statement for a symbolic variable may be, for example, the annotation "@Symbolic("true")" and the instruction starting with "public static" illustrated in FIG. 7. The execution control part 106 stores a variable name and a variable type in association with each other into the variable storing unit 103.

FIG. 12 illustrates an example of a variable storing unit. The variable storing unit illustrated in FIG. 12 may be the variable storing unit 103 illustrated in FIG. 4. Referring to FIG. 12, names of variables and types of variables are stored.

The execution control part 106 determines whether or not an unprocessed declaration statement exists (operation S23). In the case where no unprocessed declaration statement exists (operation S23: No route), the process returns to the process illustrated in FIG. 9. In the case where an unprocessed declaration statement exists (operation S23: Yes route), the execution control part 106 identifies an unprocessed declaration statement (operation S25).

The execution control part 106 determines whether or not an initial value is declared (operation S27). In the case where an initial value is declared (operation S27: Yes route), the execution control part 106 sets the initial value for the fixed value of a symbolic variable in the declaration statement (operation S29). The initial value may be, for example, a value subsequent to "param1=" in FIG. 7. In the case where no initial value is declared (operation S27: No route), the execution control part 106 generates an initial value corresponding to the type of the symbolic variable in the declaration statement, and sets the generated initial value for the fixed value of the symbolic variable (operation S31). The initial value corresponding to the type of a symbolic variable may be a specific value complying with the type of the symbolic variable. For example, in the case of an integer type, "1" may be set. For example, the symbolic variable and the fixed value set in operations S29 and S31 may be stored in association with each other into a storing device such as a main memory.

With the execution of the process described above, an appropriate value may be extracted as a fixed value of a fixed symbolic variable.

Figure 13:
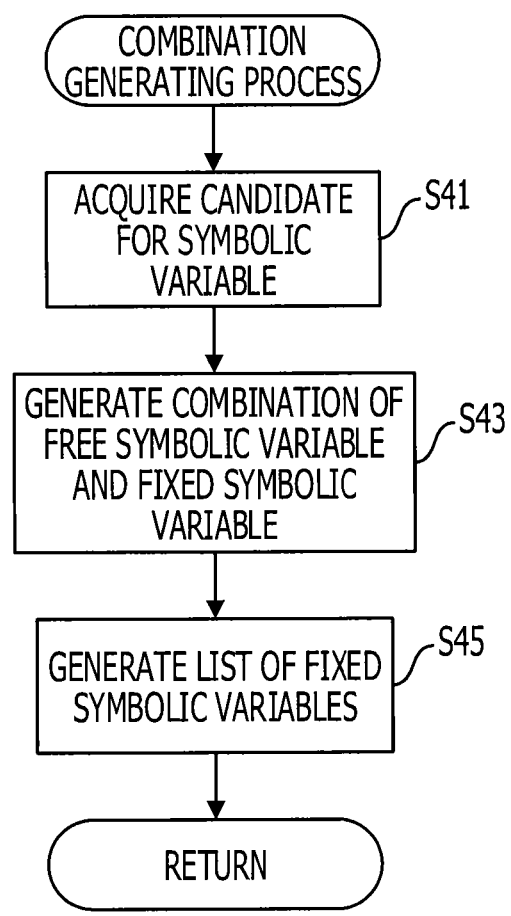
FIG. 13 illustrates an example of a combination generating process.

Referring back to FIG. 9, the execution control part 106 performs a combination generating process (operation S3). FIG. 13 illustrates an example of a combination generating process.

The execution control part 106 acquires, from the variable storing unit 103, data of candidates for a symbolic variable, such as variable names and variable types (FIG. 13: operation S41).

The execution control part 106 generates a combination of a free symbolic variable and a fixed symbolic variable (operation S43), and outputs, to the fixed data calculating part 105, the data acquired in operation S41 and the fixed values set in operations S29 and S31.

FIG. 14 illustrates an example of a combination. The combinations illustrated in FIG. 14 may be combinations generated by the execution control part 106 illustrated in FIG. 4. The generated combinations illustrated in FIG. 14 include a combination of a variable SDriver.param1 defined as a free symbolic variable and variables SDriver.param2 and SDriver.param3 defined as fixed symbolic variables, a combination of a variable SDriver.param2 defined as a free symbolic variable and variables SDriver.param3 and SDriver.param1 defined as fixed symbolic variables, and a combination of a variable SDriver.param3 defined as a free symbolic variable and variables SDriver.param1 and SDriver.param2 defined as fixed symbolic variables.

The fixed data calculating part 105 generates data of fixed symbolic variables including the data received from the execution control part 106 (operation S45), and stores the generated data into the fixed data storing unit 107. The process is terminated.

FIG. 15 illustrates an example of a fixed data storing unit. The fixed data storing unit illustrated in FIG. 15 may be the fixed data storing unit 107 illustrated in FIG. 4. Names of fixed symbolic variables, types of variables, and fixed values are stored in the fixed data storing unit 107 illustrated in FIG. 15. The fixed values may be initial values set in operations S29 and S31. Information on fixed symbolic variables for individual combinations is stored in the fixed data storing unit 107.

By performing symbolic execution for the generated combinations, symbolic execution may be performed repeatedly.

Referring back to FIG. 9, the execution control part 106 determines whether or not an unprocessed combination exists (operation S5). In the case where an unprocessed combination exists (operation S5: Yes route), the execution control part 106 identifies an unprocessed combination (operation S7).

Figure 16:
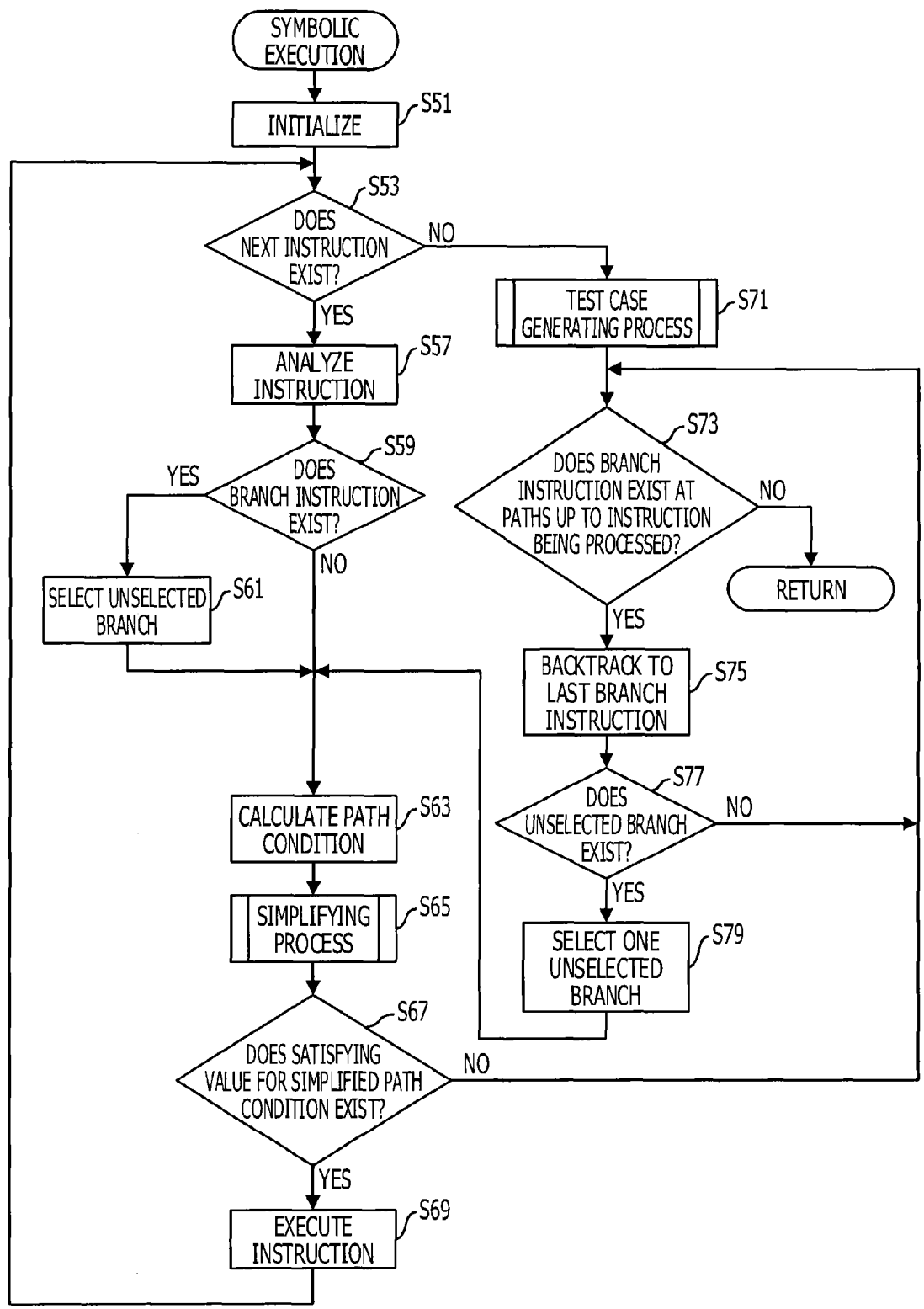
FIG. 16 illustrates an example of a symbolic execution process.

The execution control part 106 issues a request to the symbolic execution unit 112 to perform symbolic execution on the combination identified in operation S7. In response to this request, the execution engine 113 performs symbolic execution (operation S9). FIG. 16 illustrates an example of a symbolic execution process. The execution engine 113 may manage the data illustrated in FIG. 15 in the process of the symbolic execution. FIG. 17 illustrates an example of management data for execution engine. Referring to FIG. 17, the execution engine 113 manages symbolic variables, types of symbolic variables, and symbolic values. The symbolic values may be values which actually appear in path conditions. For example, a symbolic variable may not appear in the form of "Sdriver••" but may appear in the form of "param••" in a path condition. By the time of completing generation of a path condition, symbolic execution may be performed without distinction between a free symbolic variable and a fixed symbolic variable.

The execution engine 113 performs initialization of symbolic execution (FIG. 16: operation S51). For example, the execution engine 113 moves the execution position to the beginning of the program and clears the memory contents.

The execution engine 113 determines whether or not the next instruction exists in the program (operation S53). In the case where the next instruction exists (operation S53: Yes route), the execution engine 113 analyzes the instruction (hereinafter, called an instruction to be processed) (operation S57). For example, analysis may be performed on the details of the instruction, a related variable, and the like.

The execution engine 113 determines whether or not the instruction to be processed is a branch instruction (operation S59). In the case where the instruction to be processed is a branch instruction (operation S59: Yes route), the execution engine 113 selects an unselected branch for the branch instruction (operation S61). The process proceeds to processing of operation S63.

In the case where the instruction to be processed is not a branch instruction (operation S59: No route), the execution engine 113 issues a request to the path condition calculating part 114 to perform processing. In response to the request, the path condition calculating part 114 calculates a path condition (operation S63). The path condition calculating part 114 outputs the calculated path condition to the converting unit 108.

Figure 18:
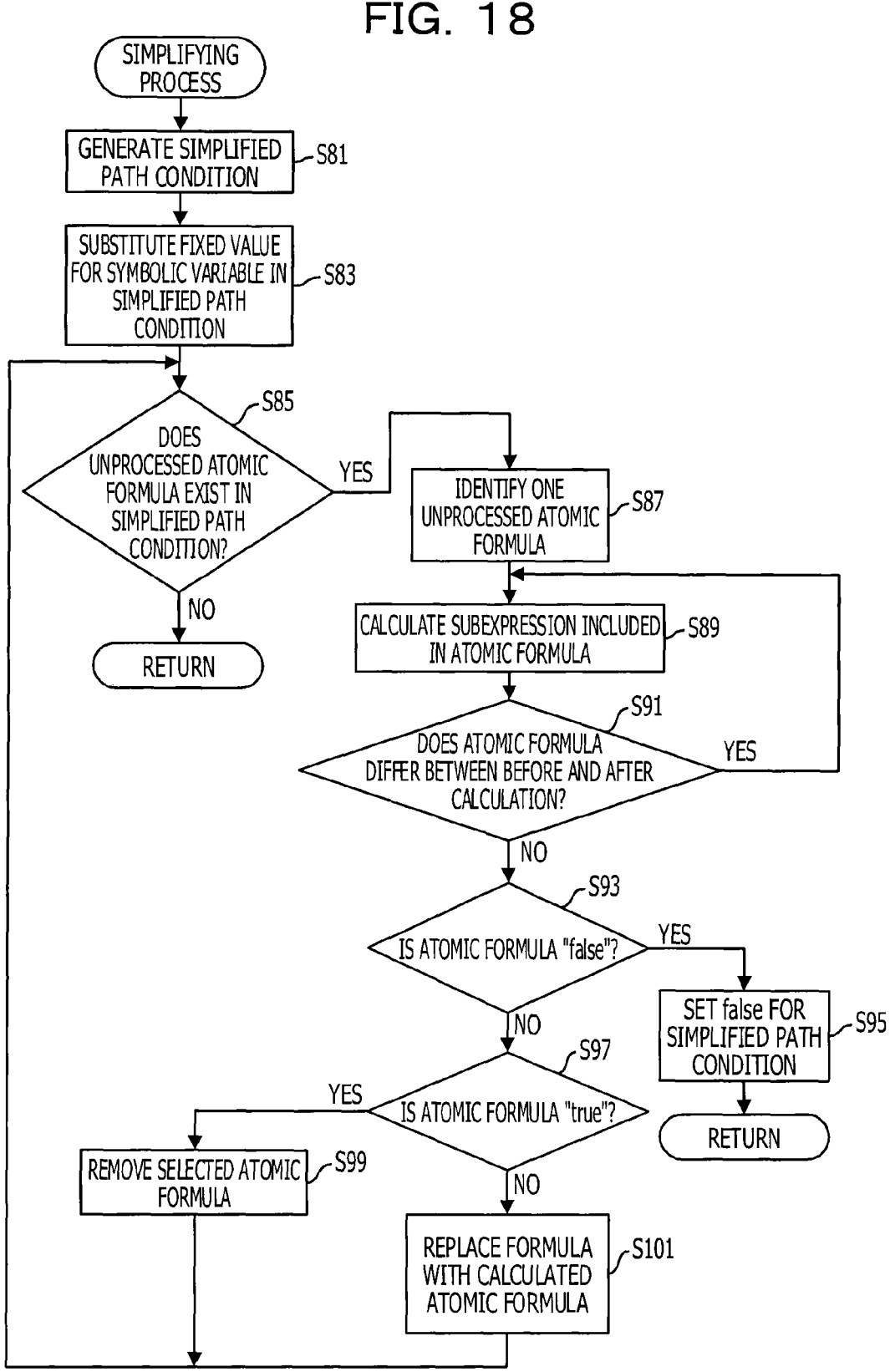
FIG. 18 illustrates an example of a simplifying process.

In accordance with this, the converting unit 108 performs a simplifying process (operation S65). FIG. 18 illustrates an example of a simplifying process.

The substituting part 109 generates a simplified path condition by generating copy of the path condition received from the path condition calculating part 114 (FIG. 18: operation S81). The simplified path condition generated in operation S81 might not be a path condition that has been simplified. By the processing of operation S81, for example, a simplified path condition ""param3".startsWith("ZZ01")"^("param3".subString(4).equals("00"))^(param1−param2+100)>0" may be generated.

The substituting part 109 extracts, from the fixed data storing unit 107, a fixed value corresponding to a symbolic variable included in the simplified path condition generated in operation S81, and substitutes the extracted fixed value for the symbolic variable (operation S83). The substituting part 109 outputs the processed simplified path condition to the simplifying part 110. By the processing of operation S83, for example, a simplified path condition "("ZZ0100".startsWith("ZZ01"))^("ZZ0100".subString(4).equals("00"))^((param1−100+100)>0)" may be generated.

Since data of fixed symbolic variables for individual combinations are stored in the fixed data storing unit 107, the substituting part 109 extracts a fixed value from data of the combination on which the processing is currently being performed.

The simplifying part 110 determines whether or not an unprocessed atomic formula, or atomic formula exists in the simplified path condition (operation S85). The atomic formula may be an element coupled using "and". For example, in the case where a simplified path condition is "("ZZ0100".startsWith("ZZ01"))^("ZZ0100".subString(4).equals("00"))^((param1−100+100)>0)", atomic formulae are ""ZZ0100".startsWith("ZZ01")", ""ZZ0100".subString(4).equals("00")", and "(param1−100+100)>0".

In the case where no unprocessed atomic formula exists (operation S85: No route), since the simplifying processing is completed, the simplifying part 110 stores the path condition that has not been subjected to the simplifying processing and the simplified path condition in association with each other into the simplified data storing unit 111. The process returns to the process illustrated in FIG. 9.

In the case where an unprocessed atomic formula exists (operation S85: Yes route), the simplifying part 110 identifies the formula (operation S87). The atomic formula identified in operation S87 may be referred to as an "atomic formula to be processed".

The simplifying part 110 performs calculation of a subexpression included in the atomic formula to be processed (operation S89). A subexpression that is capable of being calculated may be a subexpression that is independent of a free symbolic value or a subexpression to which a specific simplifying rule is applied. For example, the result of the calculation of a subexpression "100−100" in an atomic formula "param1−100+100" is obtained as 0.

The simplifying part 110 determines whether or not the atomic formula to be processed differs between before and after the calculation (operation S91). In the case where a difference occurs in the atomic formula to be processed (operation S91: Yes route), the process returns to operation S89. In the case where no difference occurs in the atomic formula to be processed (operation S91: No route), the simplifying part 110 determines whether or not the atomic formula to be processed is "false", for example, whether or not the atomic formula to be processed is an unsatisfied atomic formula (operation S93). In the case where the atomic formula to be processed is "false" (operation S93:

Yes route), since the atomic formula to be processed is not satisfied, the simplifying part 110 sets "false" for the simplified path condition (operation S95). The simplifying part 110 stores the path condition that has not been subjected to simplification and the simplified path condition (false) in association with each other into the simplified data storing unit 111. The process returns to the process illustrated in FIG. 9.

In the case where the atomic formula to be processed is not "false" (operation S93: No route), the simplifying part 110 determines whether or not the atomic formula to be processed is "true" for example, whether or not the atomic formula to be processed is a satisfied atomic formula (operation S97). In the case where the atomic formula to be processed is "true" (operation S97: Yes route), the simplifying part 110 removes the atomic formula to be processed from the simplified path condition (operation S99). In the case where the atomic formula to be processed is not "true" (operation S97: No route), the simplifying part 110 replaces the atomic formula identified in operation S87 with the calculated atomic formula (operation S101). After the processing of operations S99 and S101, the process returns to operation S85.

With the execution of the process described above, a simplified path condition including a free symbolic variable may be generated by simplifying a path condition including a free symbolic variable and a fixed symbolic variable.

Figure 19:
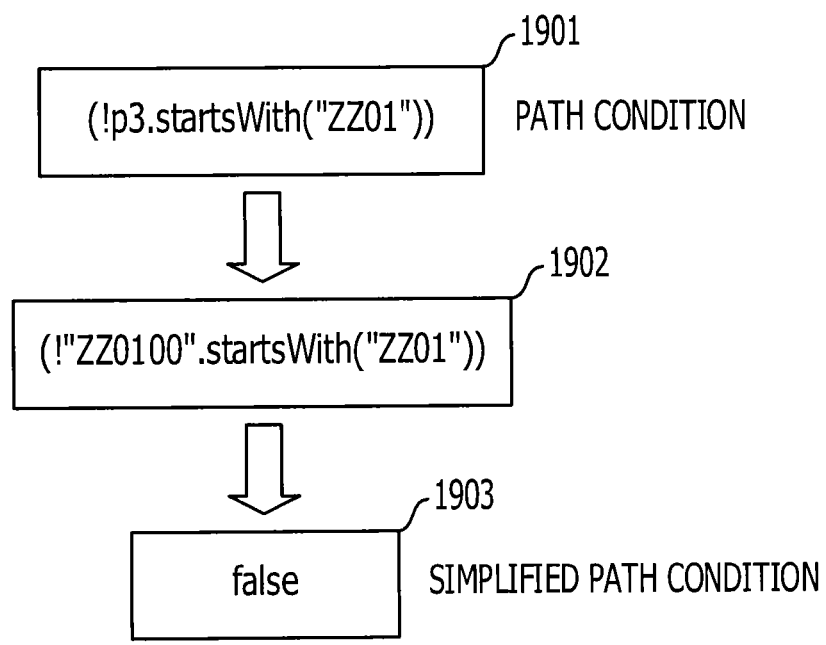
FIG. 19 illustrates an example of a simplifying process.
Figure 20:
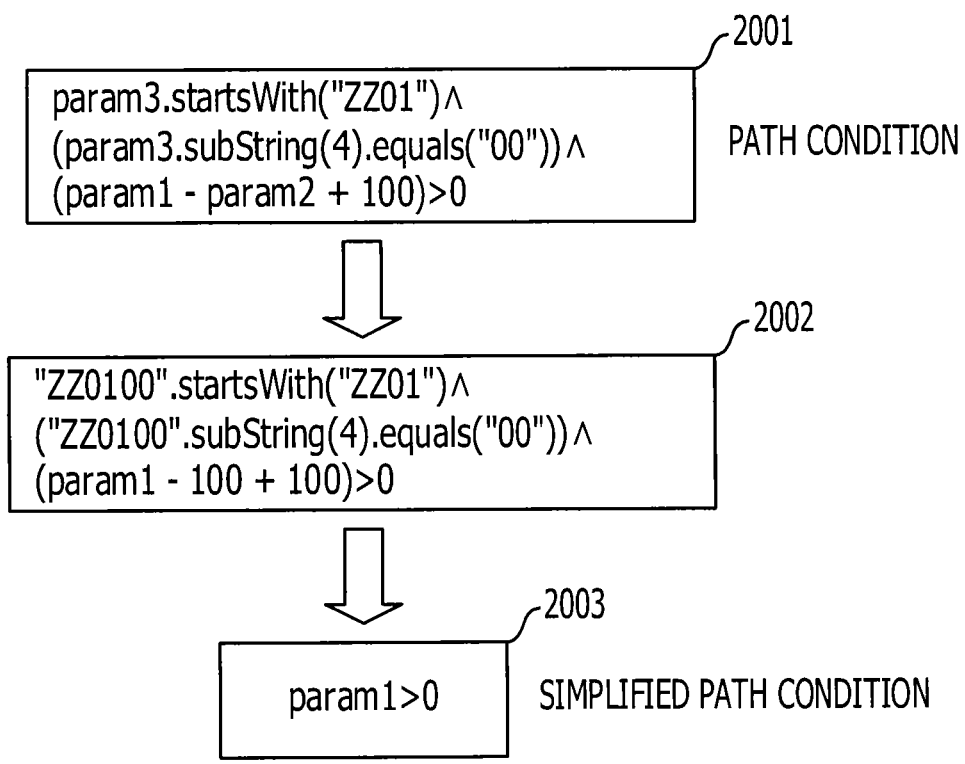
FIG. 20 illustrates an example of a simplifying process.

FIGS. 19 and 20 illustrate an example of a simplifying process. For example, in a path condition 1901 illustrated in FIG. 19, a fixed symbolic variable may be p3. When a fixed value ""ZZ0100"" is substituted for p3 by the substituting part 109, a simplified path condition 1902 is generated. The simplifying part 110 determines whether or not the simplified path condition 1902 is satisfied. Since this simplified path condition is not satisfied, a simplified path condition 1903 may be eventually obtained.

For example, in a path condition 2001 illustrated in FIG. 20, it is assumed that a free symbolic variable is param1 and fixed symbolic variables are param2 and param3. When the substituting part 109 substitutes fixed values "100" and ""ZZ0100"" for param2 and param3, respectively, a simplified path condition 2002 is generated. The individual atomic formulae are simplified by the simplifying part 110 and it is determined whether or not each of the atomic formulae is satisfied. Simplification may be done until a simplified path condition 2003 is finally obtained.

A simplifying procedure after a fixed value is substituted will be described later.

(1) A conversion rule (1a) is applied to each atomic formula until there is no portion to which the conversion rule (1a) is to be applied.

(1a) The value of a subexpression that is free from symbolic variables is converted into a result obtained by calculation of the subexpression.

(2) If there is any atomic formula converted into false after (1) is performed, a simplified path condition is defined as false.

(3) For a simplified path condition that is not converted into false after (1) and (2) are performed, a condition obtained by removing an atomic formula converted into true is set as a simplified path condition.

Figure 21:
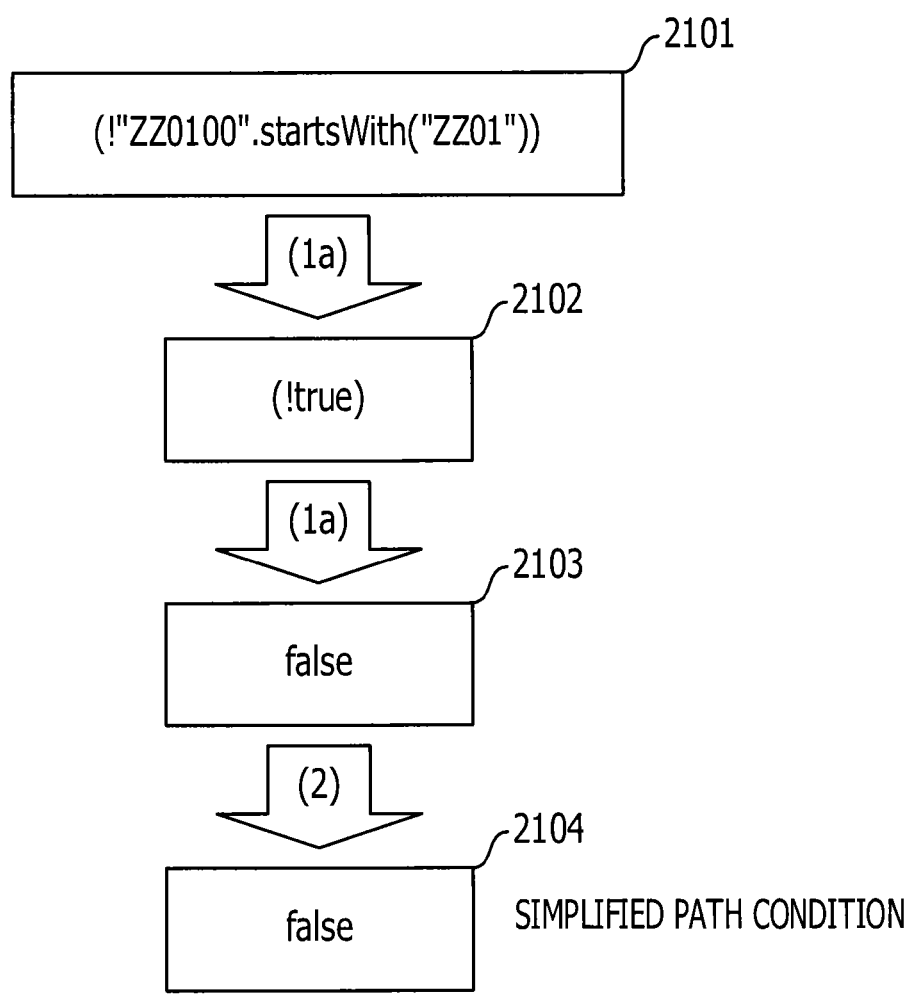
FIG. 21 illustrates an example of simplification of an atomic formula.
Figure 22:
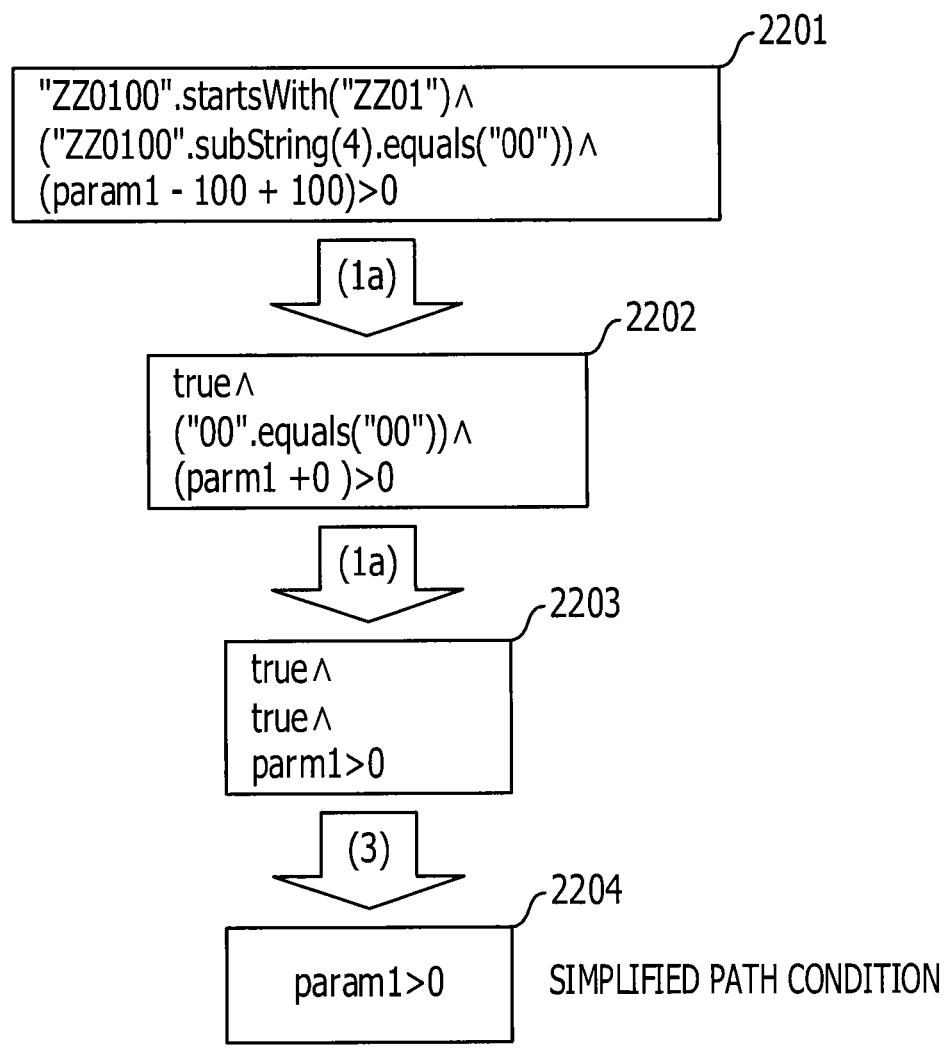
FIG. 22 illustrates an example of simplification of an atomic formula.

FIGS. 21 and 22 illustrate an example of simplification of an atomic formula. The simplification illustrated in FIGS. 21 and 22 may be performed in accordance with the simplifying procedure described above.

Referring to FIG. 21, simplification of a path condition 2101 is performed. The conversion rule (1a) is applied in the procedure (1), and a simplified path condition 2102 is generated. The conversion rule (1a) is applied to the generated simplified path condition, and a simplified path condition 2103 is generated. The simplified path condition 2103 is simplified by the procedure (2), and a simplified path condition 2104 is eventually obtained.

Referring to FIG. 22, simplification of a path condition 2201 is performed. The conversion rule (1a) is applied to each atomic formula in the procedure (1), and a simplified path condition 2202 is generated. The conversion rule (1a) is applied to the second and third atomic formulae in the simplified path condition 2202, and a simplified path condition 2203 is generated. The simplified path condition 2203 is simplified by the procedure (3), and a simplified path condition 2204 is eventually obtained.

Referring back to FIG. 16, the test input generating part 115 determines whether or not a satisfying value for the simplified path condition newly stored in the simplified data storing unit 111 exists (operation S67). In the case where a satisfying value for the simplified path condition exists (operation S67: Yes route), since the instruction to be processed is executable, the test input generating part 115 issues a request to the execution engine 113 to execute the instruction to be processed. In response to the request, the execution engine 113 executes the instruction to be processed (operation S69). The process returns to operation S53. In the case where no satisfying value for the simplified path condition exists (operation S67: No route), the process proceeds to operation S73.

Figure 23:
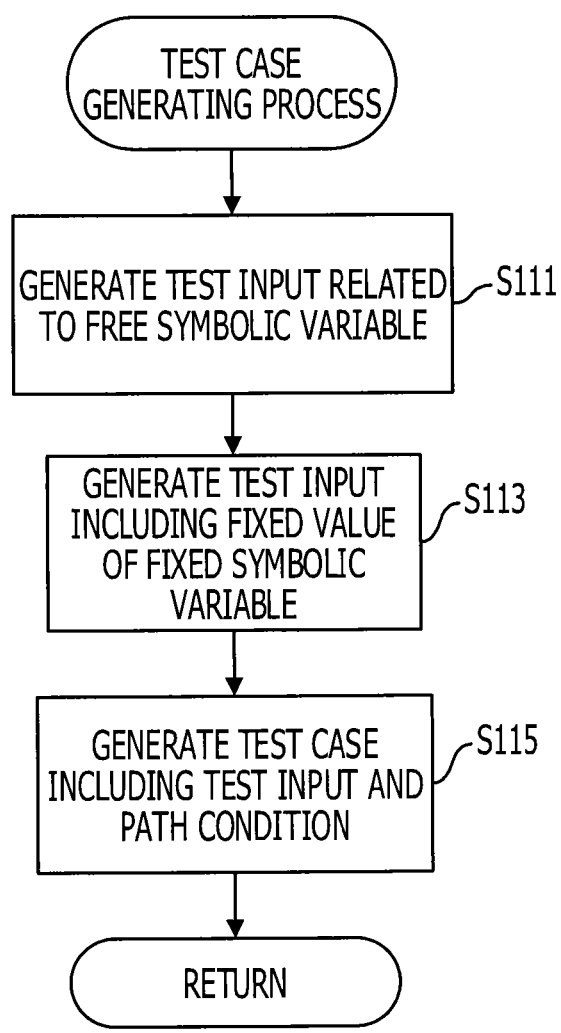
FIG. 23 illustrates an example of a test generating process.

In the case where it is determined in operation S53 that no next instruction exists (operation S53: No route), the execution engine 113 issues a request to the test input generating part 115 to perform a test case generating process. In response to the request, the test input generating part 115 and the test case generating part 116 perform the test case generating process (operation S71). FIG. 23 illustrates an example of a test case generating process.

The test input generating part 115 generates test input relating to a free symbolic variable by calculating a satisfying value for the simplified path condition stored in the simplified data storing unit 111, and stores the generated test input into a storing device such as a main memory (FIG. 23: operation S111). For example, in the case where a simplified path condition "param1>0" is stored in the simplified data storing unit 111, test input "param1=1" is generated. The satisfying value may be calculated using a known constraint solver or the like.

The test input generating part 115 generates test input including a fixed value of a fixed symbolic variable, and stores the generated test input into a storing device such as a main memory (operation S113). For example, in the case where fixed symbolic variables are SDriver.param2 and SDriver.param3, the test input generating part 115 reads from the fixed data storing unit 107 fixed values for the SDriver.param2 and the SDriver.param3. The test input generating part 115 generates, for example, test input "param1=100" and "param3=""ZZ0100"""".

The test input generating part 115 outputs the test input generated in operation S111 and the test input generated in operation S113 to the test case generating part 116. Upon receiving the test inputs, the test case generating part 116 generates a test case including the test input received from the test input generating part 115 and a path condition that has not been subjected to simplification (operation S115), and stores the generated test case into the first test case storing unit 117. The path condition that has not been subjected to simplification may be a path condition that is associated with a simplified path condition in the simplified data storing unit 111. The process is terminated.

With the execution of the process described above, a path condition that has not been subjected to simplification is associated with test input including a satisfying value satisfying a simplified path condition and a fixed value.

Referring back to FIG. 16, the execution engine 113 determines whether or not a branch instruction exists in paths up to the instruction to be processed (operation S73). In the case where no branch instruction exists (operation S73: No route), since all the reachable paths have been performed, the process returns to the process illustrated in FIG. 9. In the case where a branch instruction exists (operation S73: Yes route), the execution engine 113 backtracks to the last branch instruction (operation S75).

The execution engine 113 determines whether or not an unselected branch exists for the last branch instruction, for example, whether or not an unexecuted path exists (operation S77). In the case where no unselected branch exists (operation S77: No route), the process returns to operation S73 in order to search for a different branch instruction. In the case where an unselected branch exists (operation S77: Yes route), the execution engine 113 selects an unselected branch (operation S79). The process proceeds to operation S63.

By the time of completing generation of a path generation, any variable is symbolized without distinction between a free symbolic variable and a fixed symbolic variable. Thus, a path condition related to all the symbolic variables may be generated.

For example, in the case where symbolic execution is repeatedly performed in a different method, a path condition that is only related to a symbolic variable for which a default value is not substituted may be generated, and different path conditions may be obtained for test cases passing through the same path. Thus, it might not be determined whether or not test cases are redundant. With the method mentioned above, for the same symbolic variable, path conditions generated for test cases passing through the same path may be substantially the same. Thus, when symbolic execution is repeatedly performed while switching between a free symbolic variable and a fixed symbolic variable, it may be determined, based on a path condition that has not been subjected to simplification, that test cases are redundant.

By using a simplified path condition which is a path condition that is only related to a free symbolic variable for determination of satisfiability and generation of test input, occurrence of path explosion may be reduced.

Figure 24:
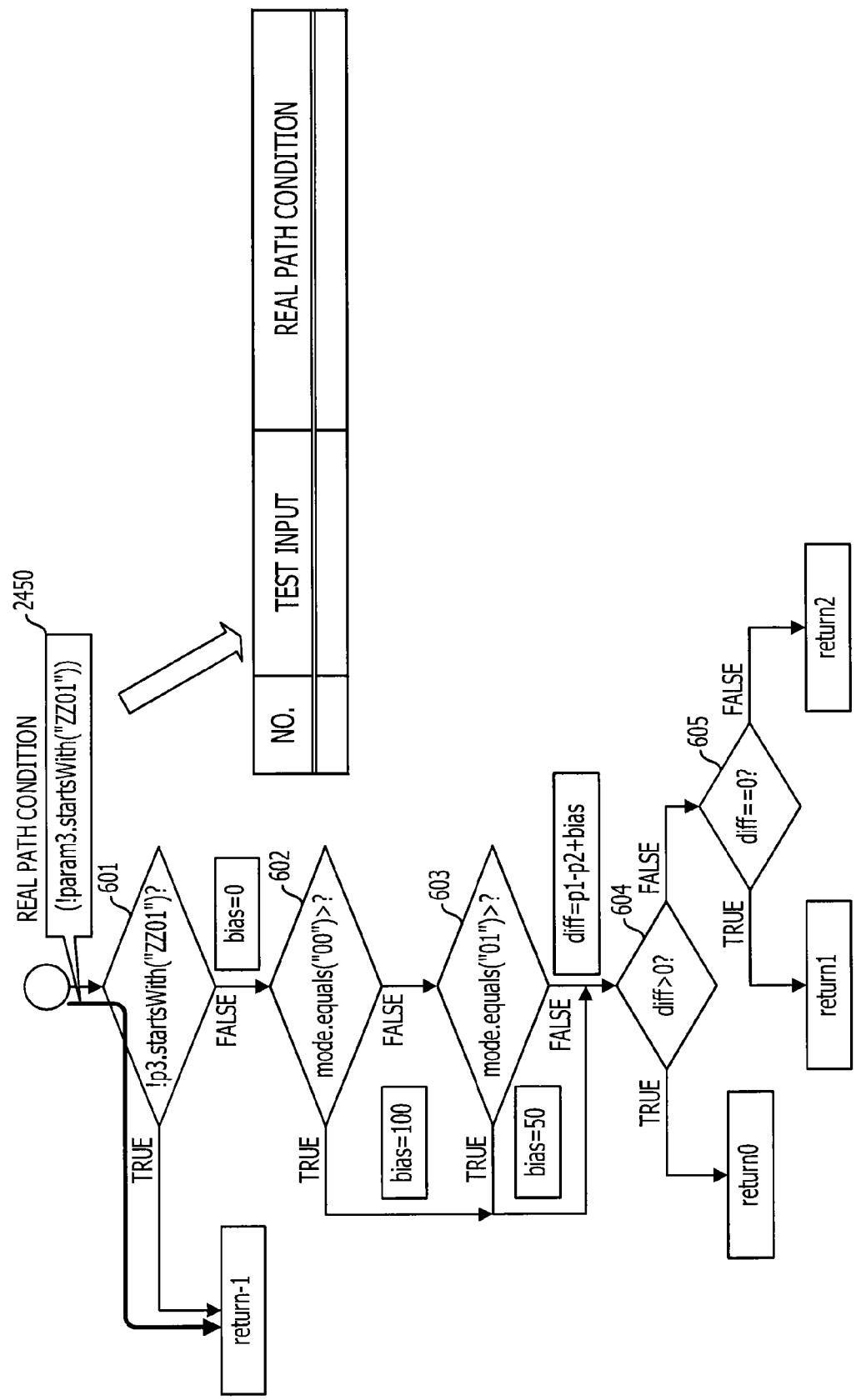
FIG. 24 illustrates an example of a test generating process.
Figure 25:
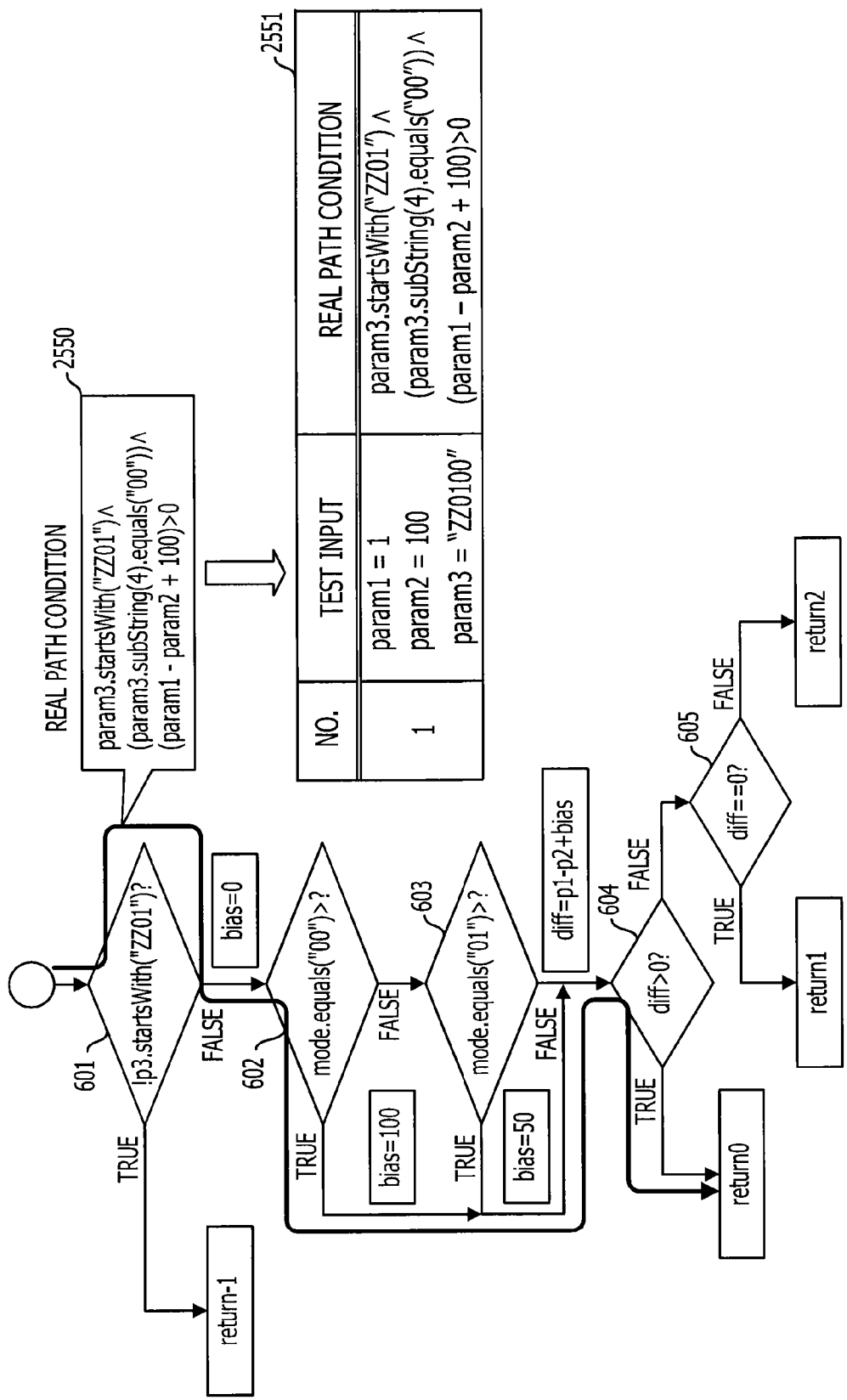
FIG. 25 illustrates an example of a test generating process.

FIGS. 24 and 25 illustrate an example of a test generating process. Referring to FIGS. 24 and 25, a test case is generated by symbolic execution. FIG. 24 illustrates the case in which it is determined that a condition is satisfied at the branch 601 of the program illustrated in FIG. 6. A path condition 2450 may be generated eventually. In the case where it is determined that no satisfying value that satisfies a simplified path condition obtained by simplifying a path condition exists, no test case may be generated for the path condition.

FIG. 25 illustrates the case in which it is determined that a condition is not satisfied at the branch 601 of the program illustrated in FIG. 6, it is determined that a condition is satisfied at the branch 602, and it is determined that a condition is satisfied at the branch 604. A path condition 2550 may be generated eventually. When it is determined that a satisfying value that satisfies a simplified path condition obtained by simplifying a path condition exists, for example, a test case 2551 illustrated in FIG. 25 may be generated.

FIG. 26 illustrates an example of a first test case storing unit. The first test case storing unit illustrated in FIG. 26 may be the first test case storing unit 117 illustrated in FIG. 4. Referring to FIG. 26, identification numbers of test cases, test inputs, and path conditions are stored.

Figure 27:
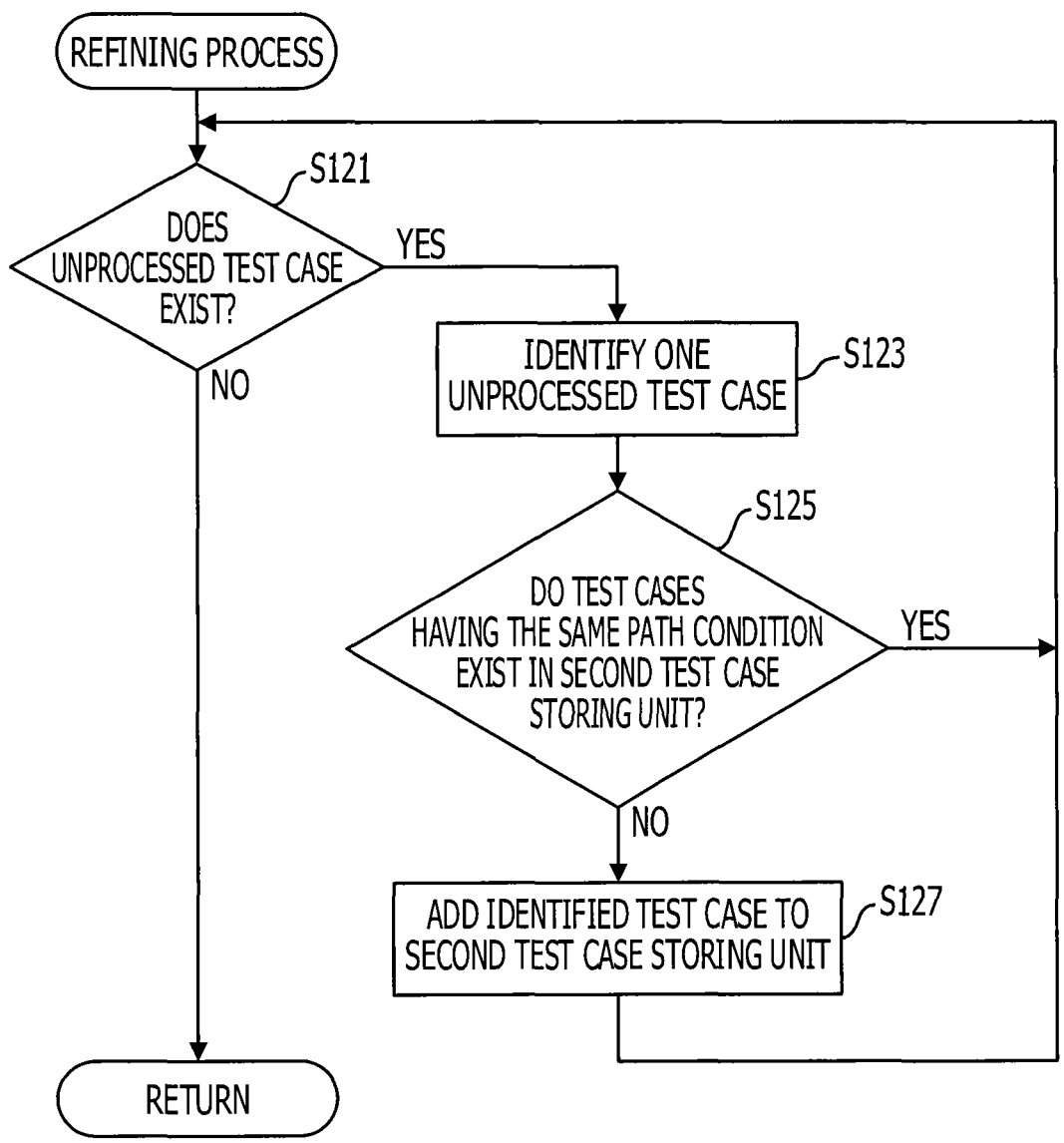
FIG. 27 illustrates an example of a refining process.

Referring back to FIG. 9, when symbolic execution is completed, the process returns to operation S5. In the case where it is determined in operation S5 that no unprocessed combination exists (operation S5: No route), the execution control part 106 issues a request to the removing unit 118 to perform processing. In response to the request, the removing unit 118 performs a refining process (operation S11), and the process is terminated. FIGS. 27 and 28 illustrate an example of a refining process.

The removing unit 118 determines whether or not an unprocessed test case exists among test cases stored in the first test case storing unit 117 (FIG. 27: operation S121). In the case where no unprocessed test case exists (operation S121: No route), the process returns to the process illustrated in FIG. 9. In the case where an unprocessed test case exists (operation S121: Yes route), the removing unit 118 identifies an unprocessed test case (operation S123).

The removing unit 118 determines whether or not a test case including the same path condition as a path condition included in the test case identified in operation S123 is stored in the second test case storing unit 119 (operation S125). In the case where a test case including the same path condition is stored in the second test case storing unit 119 (operation S125: Yes route), since redundant test cases exist, the process returns to operation S121.

In the case where no test case including the same path condition is stored in the second test case storing unit 119 (operation S125: No route), the removing unit 118 adds the test case identified in operation S123 to the second test case storing unit 119 (operation S127). The process returns to the processing of operation S121.

With the execution of the process described above, a redundant test case stored in the first test case storing unit 117 may be removed.

FIG. 28 illustrates an example of a second test case storing unit. The second test case storing unit illustrated in FIG. 28 may be the second test case storing unit 119 illustrated in FIG. 4. Referring to FIG. 28, identification numbers of test cases, test inputs, and path conditions are stored. The test cases illustrated in FIG. 28 may correspond to test cases not including some of the test cases illustrated in FIG. 26. A path condition for a test case 4 is the same as a path condition for a test case 1. A path condition for a test case 5 is the same as a path condition for a test case 2. A path condition for a test case 6 is the same as a path condition for a test case 3. A path condition for a test case 8 is the same as a path condition for the test case 1 or the test case 4. Thus, the test cases 4 to 6 and the test case 8 are removed.

In the processing flows, the order of processing operations may be changed or may be performed concurrently as long as the same processing result is obtained.

The number of free symbolic variables may be one, two, or more.

The second test case storing unit 119 might not be provided. For example, the removing unit 118 may remove one or more of test cases stored in the first test case storing unit 117.

Figure 29:
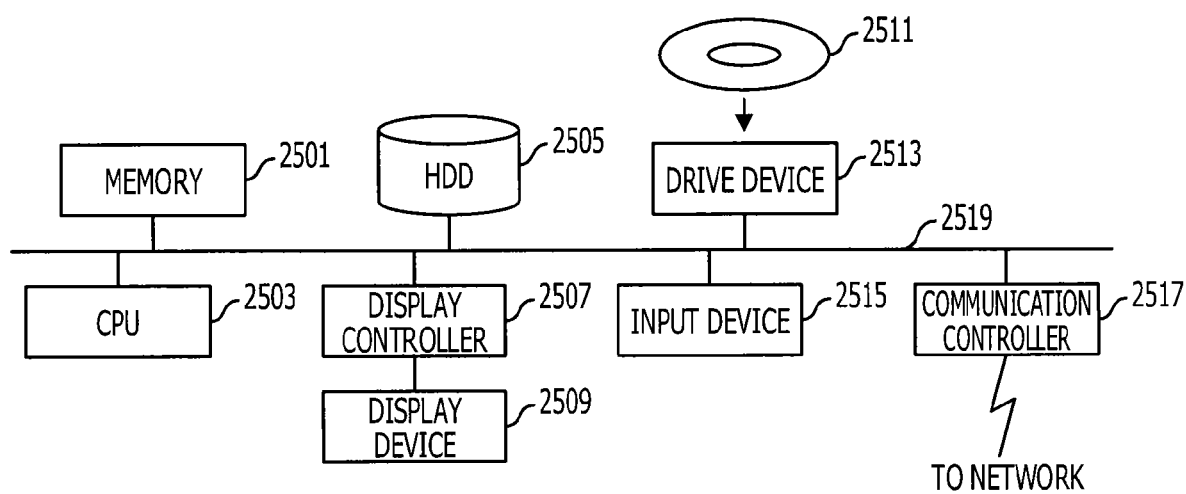
FIG. 29 illustrates an example of a computer system.

FIG. 29 illustrates an example of a computer system. The test case generating apparatus 1 may be a computer system.

A memory 2501, a central processing unit (CPU) 2503, a hard disk drive (HDD) 2505, a display controller 2507 connected to a display device 2509, a drive device 2513 for a removable disc 2511, an input device 2515, and a communication controller 2517 that allows connection with a network are coupled through a bus 2519. An operating system (OS) and an application program for performing the processes described above are stored in the HDD 2505 and are read from the HDD 2505 into the memory 2501 when they are executed by the CPU 2503. The CPU 2503 controls the display controller 2507, the communication controller 2517, and the drive device 2513, in accordance with the details of processing of the application program, to perform specific operations. Data that is being processed is mainly stored in the memory 2501. However, the data that is being processed may be stored in the HDD 2505. The application program for performing the processes described above may be stored in the removable disc 2511 that is readable by a computer and be distributed. The application program may be installed from the drive device 2513 into the HDD 2505. The application program may be installed into the HDD 2505 via a network such as the Internet and the communication controller 2517. In the computer system, the functions described above are executed by cooperating hardware including the CPU 2503, memory 2501, and the like and the programs including the OS, the application program, and the like in an organic manner.

In a test data generating method, (A) for each of a plurality of path conditions generated by repeatedly performing symbolic execution, a simplified path condition obtained by simplifying a path condition is generated by substituting a fixed value for one or more of symbolic variables included in the path condition; (B) for each of the generated plurality of simplified path conditions, the value of a symbolic variable that satisfies the simplified path condition is calculated, and test data including the calculated value, a fixed value, and a path condition that has not been subjected to simplification is generated and is stored into a data storing unit; and (C) part of test data stored in the data storing unit is removed so that redundancy of test data including the same path condition does not occur in the data storing unit.

For test data generated for the same path, even if the combination of the value of a symbolic variable that satisfies a simplified path condition and a fixed value differs between the test data, the path conditions that have not been subjected to simplification are substantially the same. Thus, redundant test data may be removed. Since processing for obtaining the value of a symbolic variable that satisfies a simplified path condition is performed, the amount of calculation may be reduced.

In the test data generating method, (D) a plurality of combinations of a first symbolic variable for which a fixed value is not substituted and a second symbolic variable for which a fixed value is substituted may be generated. For example, in the processing for generating a simplified path condition, (a1) for each of the plurality of combinations, symbolic execution may be performed. Symbolic execution may be repeatedly performed so that paths of a program are covered in a comprehensive manner.

In the processing for generating a simplified path condition, (a2) a fixed value may be substituted for the second symbolic variable included in a path condition, and it may be determined whether at least one of formulae included in the path condition is not satisfied; (a3) in the case where it is determined that at least one of the formulae included in the path condition is not satisfied, a simplified path condition in which no satisfying value exists may be generated; and (a4) in the case where it is determined that all the formulae included in the path condition are satisfied, a simplified path condition may be generated by substituting a fixed value for the second symbolic variable included in the path condition. Test data may be generated only for a reachable path.

The fixed value mentioned above may be a value complying with a symbolic variable declared in a program on which symbolic execution is to be performed. Symbolic execution may be performed without any problem.

A program for causing a computer to execute the processes described above may be generated. The program may be stored, for example, in a computer-readable storing medium, such as a flexible disk, a CD-ROM, a magneto-optical disk, a semiconductor memory, a hard disk, or the like, or a storing device. An intermediate processing result may be temporarily stored in a storing device, such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing therein a program to be executed by a computer, the program causing the computer to:
    generate, for each of a plurality of path conditions obtained by repeatedly performing symbolic execution, a simplified path condition;
    calculate, for each simplified path condition, a value of a symbolic variable that satisfies the respective simplified path condition;
    generate test data including the values of the symbolic variable, fixed values, and path conditions not subjected to simplification; and
    remove duplicative data from the test data that corresponds to a same path condition,
    wherein the simplified path condition is generated by:
        identifying an atomic formula included in each of the plurality of path conditions in which a fixed value is substituted for a first symbolic variable included in the path condition;
        calculating a subexpression included in the atomic formula;
        determining whether or not the atomic formula differs before and after calculation;
        determining whether the atomic formula is true;
        removing the atomic formula from the path condition in which the fixed value is substituted for the first symbolic variable when the determining determines that the atomic formula is true; and
        replacing the atomic formula with a formula in which the subexpression is calculated when the determining determines that the atomic formula is neither false nor true.

2. The non-transitory computer-readable recording medium according to claim 1, wherein the program further causes the computer to:

generate a plurality of combinations of a second symbolic variable for which a first fixed value is not substituted and the first symbolic variable for which a second fixed value is substituted; and
perform symbolic execution for each of the plurality of combinations.

3. The non-transitory computer-readable recording medium according to claim 1, wherein the simplified path condition is generated by:
determining whether the atomic formula is false; and
setting false to the simplified path condition.

4. The non-transitory computer-readable recording medium according to claim 1, wherein the fixed value is a value complying with a type of a symbolic variable declared in a program for performing the symbolic execution.

5. The non-transitory computer-readable recording medium according to claim 1, wherein the subexpression does not include a variable and is computable.

6. A test data generating method comprising:
generating, for each of a plurality of path conditions obtained by repeatedly performing symbolic execution, a simplified path condition;
calculating a value of a symbolic variable that satisfies the simplified path condition;
generating test data including the calculated value, a corresponding fixed value, and a corresponding path condition not subjected to simplification; and
removing duplicative data from the test data that corresponds to a same path condition,
wherein the simplified path condition is generated by:
identifying an atomic formula included in each of the plurality of path conditions in which a fixed value is substituted for a first symbolic variable included in the path condition;
calculating a subexpression included in the atomic formula;
determining whether or not the atomic formula differs before and after calculation;
determining whether the atomic formula is true;
removing the atomic formula from the path condition in which the fixed value is substituted for the first symbolic variable when the determining determines that the atomic formula is true; and
replacing the atomic formula with a formula in which the subexpression is calculated when the determining determines that the atomic formula is neither false nor true.

7. The test data generating method according to claim 6, further comprising:
generating a plurality of combinations of a second symbolic variable for which a first fixed value is not substituted and the first symbolic variable for which a second fixed value is substituted; and
performing symbolic execution for each of the plurality of combinations.

8. The test data generating method according to claim 6, wherein the simplified path condition is generated by:
determining whether the atomic formula is false; and
setting false to the simplified path condition.

9. The test data generating method according to claim 6, wherein the fixed value is a value complying with a type of a symbolic variable declared in a program for performing the symbolic execution.

10. The test data generating method according to claim 6, wherein the subexpression does not include a variable and is computable.

11. A test data generating apparatus comprising:
circuitry configured to:
generate, for each of a plurality of path conditions obtained by repeatedly performing symbolic execution, a simplified path condition;
calculate, for each simplified path condition, a value of a symbolic variable that satisfies the respective simplified path condition;
generate test data including the calculated values, fixed values, and path conditions not subjected to simplification; and
remove duplicative data from the test data that corresponds to a same path condition,
wherein in order to generate the simplified path condition, the circuitry is configured to:
identify an atomic formula included in each of the plurality of path conditions in which a fixed value is substituted for a first symbolic variable included in the path condition;
calculate a subexpression included in the atomic formula;
determine whether or not the atomic formula differs before and after calculation;
determine whether the atomic formula is true;
remove the atomic formula from the path condition in which the fixed value is substituted for the first symbolic variable when the determining determines that the atomic formula is true; and
replace the atomic formula with a formula in which the subexpression is calculated when the determining determines that the atomic formula is neither false nor true.

12. The test data generating apparatus according to claim 11, wherein the circuitry further to:
generate a plurality of combinations of a second symbolic variable for which a first fixed value is not substituted and the first symbolic variable for which a second fixed value is substituted; and
perform symbolic execution for each of the plurality of combinations.

13. The test data generating apparatus according to claim 11, wherein in order to generate the simplified path condition, the circuitry is further configured to:
determine whether the atomic formula is false; and
set false to the simplified path condition.

14. The test data generating apparatus according to claim 11, wherein the fixed value is a value complying with a type of a symbolic variable declared in a program for performing the symbolic execution.

15. The test data generating apparatus according to claim 11, wherein the subexpression does not include a variable and is computable.

16. An information processing system comprising:
circuitry configured to:
iteratively perform symbolic execution to obtain a plurality of path conditions for a program;
generate a plurality of simplified path conditions each corresponding to one of the plurality of path conditions;
calculate, for each of the plurality of simplified path conditions, a value for a symbolic variable that satisfies each of the plurality of simplified path conditions;
generate, for each of the plurality of simplified path conditions, test data including the calculated value, a corresponding fixed value for the symbolic variable, and a corresponding path condition that has not been subjected to simplification; and analyze the test data to remove duplicative test data corresponding to a same path condition, wherein in order to generate the simplified path condition, the circuitry is configured to:

identify an atomic formula included in each of the plurality of path conditions in which a fixed value is substituted for a first symbolic variable included in the program;

calculate a subexpression included in the atomic formula;

determine whether or not the atomic formula differs before and after calculation;

determine whether the atomic formula is true;

remove the atomic formula from the path condition in which the fixed value is substituted for the first symbolic variable when the determining determines that the atomic formula is true; and replace the atomic formula with a formula in which the subexpression is calculated when the determining determines that the atomic formula is neither false nor true.

17. The information processing system according to claim 16, wherein the circuitry is further configured to:

generate a plurality of combinations of a second symbolic variable for which a first fixed value is not substituted and the first symbolic variable for which a second fixed value is substituted; and perform symbolic execution for each of the plurality of combinations.

18. The information processing system according to claim 16, wherein in order to generate the simplified path condition, the circuitry is further configured to:

determining whether the atomic formula is false; and setting false to the simplified path condition.

19. The information processing system according to claim 16, wherein the fixed value is a value complying with a type of a symbolic variable declared in a program for performing the symbolic execution.

20. The information processing system according to claim 16, wherein the subexpression does not include a variable and is computable.

* * * * *